(12) United States Patent
Hoshino et al.

(10) Patent No.: US 11,169,018 B2
(45) Date of Patent: Nov. 9, 2021

(54) CONSTRUCTION MACHINE INCLUDING A DISPLAY DEVICE DISPLAYING THE WEIGHT OF A WORK OBJECT

(71) Applicant: HITACHI CONSTRUCTION MACHINERY CO., LTD., Tokyo (JP)

(72) Inventors: Kazunori Hoshino, Tsukuba (JP); Kunitsugu Tomita, Kashiwa (JP); Satoshi Nakamura, Hitachinaka (JP); Yousuke Yamanobe, Ushiku (JP); Youhei Toriyama, Kashiwa (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 169 days.

(21) Appl. No.: 16/492,240

(22) PCT Filed: Aug. 24, 2018

(86) PCT No.: PCT/JP2018/031448
§ 371 (c)(1),
(2) Date: Sep. 9, 2019

(87) PCT Pub. No.: WO2019/039606
PCT Pub. Date: Feb. 28, 2019

(65) Prior Publication Data
US 2020/0041331 A1 Feb. 6, 2020

(30) Foreign Application Priority Data
Aug. 24, 2017 (JP) .............................. JP2017-161633

(51) Int. Cl.
*G01G 19/16* (2006.01)
*E02F 9/26* (2006.01)
(Continued)

(52) U.S. Cl.
CPC ............... *G01G 19/16* (2013.01); *E02F 9/26* (2013.01); *G01G 19/02* (2013.01); *G01G 23/365* (2013.01)

(58) Field of Classification Search
CPC ............. G01G 19/02; G01G 19/14–18; G01G 23/365; E02F 9/26
See application file for complete search history.

(56) References Cited

U.S. PATENT DOCUMENTS 4,921,578 A * 5/1990 Shiraishi ................ G01G 19/08
177/136
7,228,505 B2 * 6/2007 Shimazu ................ B60K 37/02
715/771
(Continued)

FOREIGN PATENT DOCUMENTS

JP 58-051096 B2 11/1983
JP 05-070091 A 10/1993
(Continued)

OTHER PUBLICATIONS

International Preliminary Report on Patentability received in corresponding International Application No. PCT/JP2018/031448 dated Mar. 5, 2020.
(Continued)

*Primary Examiner* — Natalie Huls
(74) *Attorney, Agent, or Firm* — Mattingly & Malur, PC

(57) ABSTRACT

A controller (18) calculates, based on a target loading weight (P) that is a target value of a total weight of working objects to be loaded into a hauling vehicle, a set loading time number indicative of a loading time number required for the construction machine before the target loading weight (P) is reached and bucket shape information indicative of a shape of a bucket (7), an appropriate loading weight ($W_a$) that is an appropriate value of the weight of the working objects to be loaded into the hauling vehicle by a single time loading
(Continued)

work by the construction machine, creates an appropriate amount illustration (30) that is an illustration of a state at which the working objects of the appropriate loading weight ($W_a$) are loaded into the bucket and that illustrates the state of the working objects, based on the appropriate loading weight ($W_a$) and the bucket shape information, and controls a display device (19) to display an illustration (29) of the bucket (7) and the appropriate amount illustration (30) in a superimposed relationship.

9 Claims, 17 Drawing Sheets

(51) Int. Cl.
*G01G 19/02* (2006.01)
*G01G 23/365* (2006.01)

(56) References Cited

U.S. PATENT DOCUMENTS

| | | | | |
|---|---|---|---|---|
| 7,633,021 | B2* | 12/2009 | Pfohl | E02F 9/26 177/141 |
| 10,583,736 | B2* | 3/2020 | Cardona | B60K 28/08 |
| 2014/0336874 | A1* | 11/2014 | Harshberger, II | G01G 19/10 701/36 |
| 2015/0240458 | A1* | 8/2015 | Nagato | G07C 5/10 701/32.7 |
| 2020/0115888 | A1* | 4/2020 | Nakamura | E02F 3/32 |
| 2020/0299924 | A1* | 9/2020 | Kurokawa | E02F 9/24 |
| 2021/0002852 | A1* | 1/2021 | Nishi | E02F 9/20 |

FOREIGN PATENT DOCUMENTS

| | | |
|---|---|---|
| JP | 3761149 B2 | 3/2006 |
| JP | 2013-113044 A | 6/2013 |
| JP | 2014-101701 A | 6/2014 |
| JP | 6042358 B2 | 12/2016 |
| KR | 10-2012-0036114 A | 4/2012 |
| WO | 2016/092684 A1 | 6/2016 |
| WO | 2016/159839 A1 | 10/2016 |

OTHER PUBLICATIONS

Korean Office Action received in corresponding Korean Application No. 10-2019-7025630 dated Nov. 2, 2020.
Chinese Office Action received in corresponding Chinese Application No. 201880015224.6 dated Jan. 14, 2021.
International Search Report of PCT/JP2018/031448 dated Oct. 16, 2018.

* cited by examiner

CONSTRUCTION MACHINE INCLUDING A DISPLAY DEVICE DISPLAYING THE WEIGHT OF A WORK OBJECT

TECHNICAL FIELD

The present invention relates to a construction machine.

BACKGROUND ART

Since a hauling vehicle such as a dump truck that travels with transporting objects loaded thereon sometimes travels on a public road, it is necessary to restrict the loading weight of transporting objects within an allowable weight determined in advance (a maximum loading weight). Therefore, in the case where a hydraulic excavator (a loading machine) that is a construction machine for excavating and loading working objects (transporting objects) such as earth and sand or ore into a hauling vehicle is used to perform a work for loading (a loading work) of the transporting objects into the hauling vehicle, overloading that makes the loading weight excessively heavy in comparison with the maximum loading weight of the hauling vehicle must be avoided.

As a loading overweight prediction device for a construction machine that is used in a loading work, Japanese Patent No. 6042358 discloses a device including average weight calculation means for calculating an average value of a loading weight (an average weight) for each one locating action of a construction machine (loading machine) using a working object weight that is a weight of working objects being transported, remaining time number presentation means for calculating a remaining transport time number until overloading occurs using the remaining weight obtained by removing the total weight of the working objects loaded already from a maximum loading weight of the hauling vehicle and the average value determined by the average weight calculation means and presenting the remaining transport time number, loading weight calculation means for determining the average weight as a next time loading weight, and overweight prediction means for predicting occurrence of overweight (overloading) in next transport when the next time loading weight is greater than the remaining loading weight that is the remaining weight obtained by excepting the total weight of the working objects loaded already from the maximum loading weight.

PRIOR ART DOCUMENT

Patent Document

Patent Document 1: Japanese Patent No. 6042358

SUMMARY OF THE INVENTION

Problem to be Solved by the Invention

If the loading weight into the hauling vehicle is made excessively small from the maximum loading weight while avoidance of overloading of the hauling vehicle in a loading work is demanded as described above, then the work efficiency degrades because the transporting objects (working objects) to be transported once by the hauling vehicle decreases. From such a situation as just described, in a loading work by a loading machine, it is desired that transporting objects of a weight equal to the maximum loading weight as much as possible are loaded into the hauling vehicle.

According to the technology of Japanese Patent No. 6042358 mentions above, a remaining loading amount of a hauling vehicle, a weight (a current weight) of transporting objects being transported by a loading machine, an average weight in loading for each one loading action of the loading machine, a remaining loading time number until overloading occurs, and a current loading time number are merely displayed in numerical values on a monitor of the loading machine. Therefore, it is not easy for an operator to intuitively grasp, for example, by what capacity the transporting objects can be scooped up last by the loading machine to make the loading weight of the hauling vehicle closer to the maximum load weight. In other words, from the point of view that the loading weight of the hauling vehicle is made closer to the maximum loading weight without depending upon the skill of the operator, the technology of the document described above has room for improvement.

It is an object of the present invention to provide a construction machine that can make the weight of working objects to be loaded into a hauling vehicle closer to a target value readily.

Means for Solving the Problem

Although the present application includes a plurality of means for solving the subject described above, if one example is given, there is provided a construction machine including: a work implement having a bucket; a controller configured to calculate a weight of working objects in the bucket; and a display device configured to display the weight of the working objects calculated by the controller, in which the controller calculates, based on a target loading weight that is a target value of a total weight of working objects to be loaded into a hauling vehicle, a set loading time number indicative of a loading time number required for the construction machine before the target loading weight is reached, and bucket shape information indicative of a shape of the bucket, an appropriate loading weight that is an appropriate value of the weight of the working objects to be loaded into the hauling vehicle by a single time loading work by the construction machine in order to load the working objects of the target loading weight into the hauling vehicle by a number of loading works equal to the set loading time number, creates an appropriate amount illustration that is an illustration of a state at which the working objects of the appropriate loading weight are loaded into the bucket having a predetermined posture and that illustrates the state of the working objects in the bucket, on a basis of the appropriate loading weight and the bucket shape information, and controls the display device to display an illustration of the bucket having the predetermined posture and the appropriate amount illustration in a superimposed relationship.

Advantages of the Invention

According to the present invention, since it can be intuitively grasp, on the basis of the illustration of the bucket displayed on the display device, by what capacity the working objects are to be transported by the construction machine such that the loading weight of the hauling vehicle can be made closer to the target value, the working efficiency of the loading work can be improved.

MODES FOR CARRYING OUT THE INVENTION

In the following, embodiments of the present invention are described with reference to the drawings.

Figure 1:
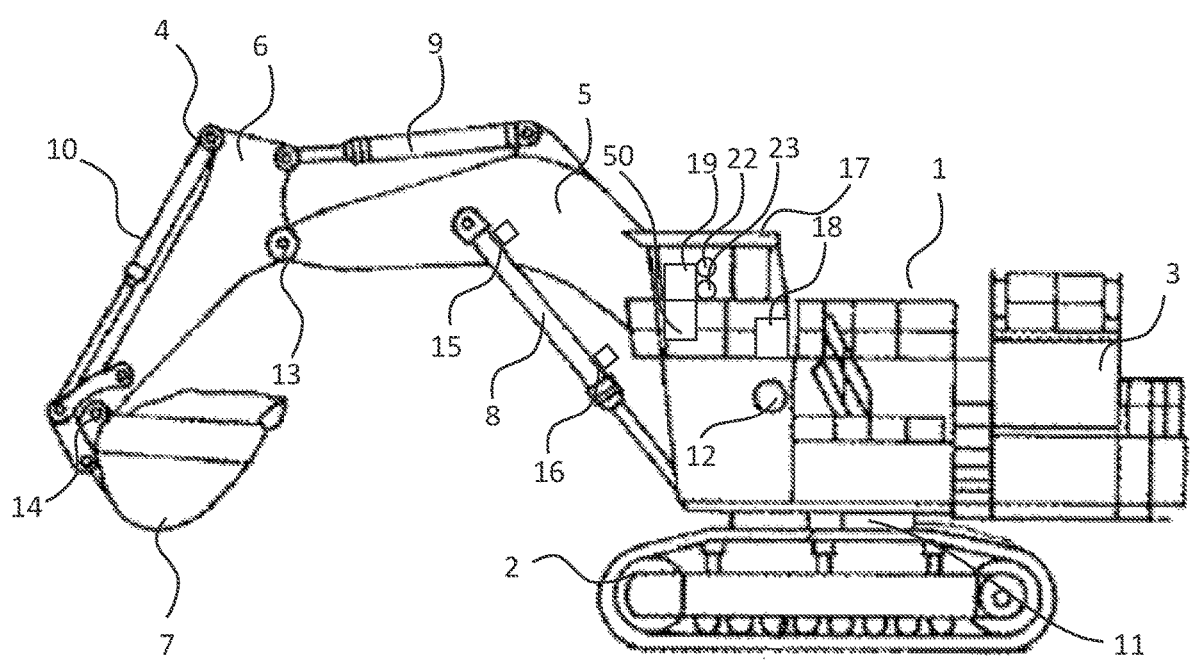
FIG. 1 is a side elevational view of a hydraulic excavator to which a load measurement system for a construction machine according to the present invention is applied.
Figure 2:
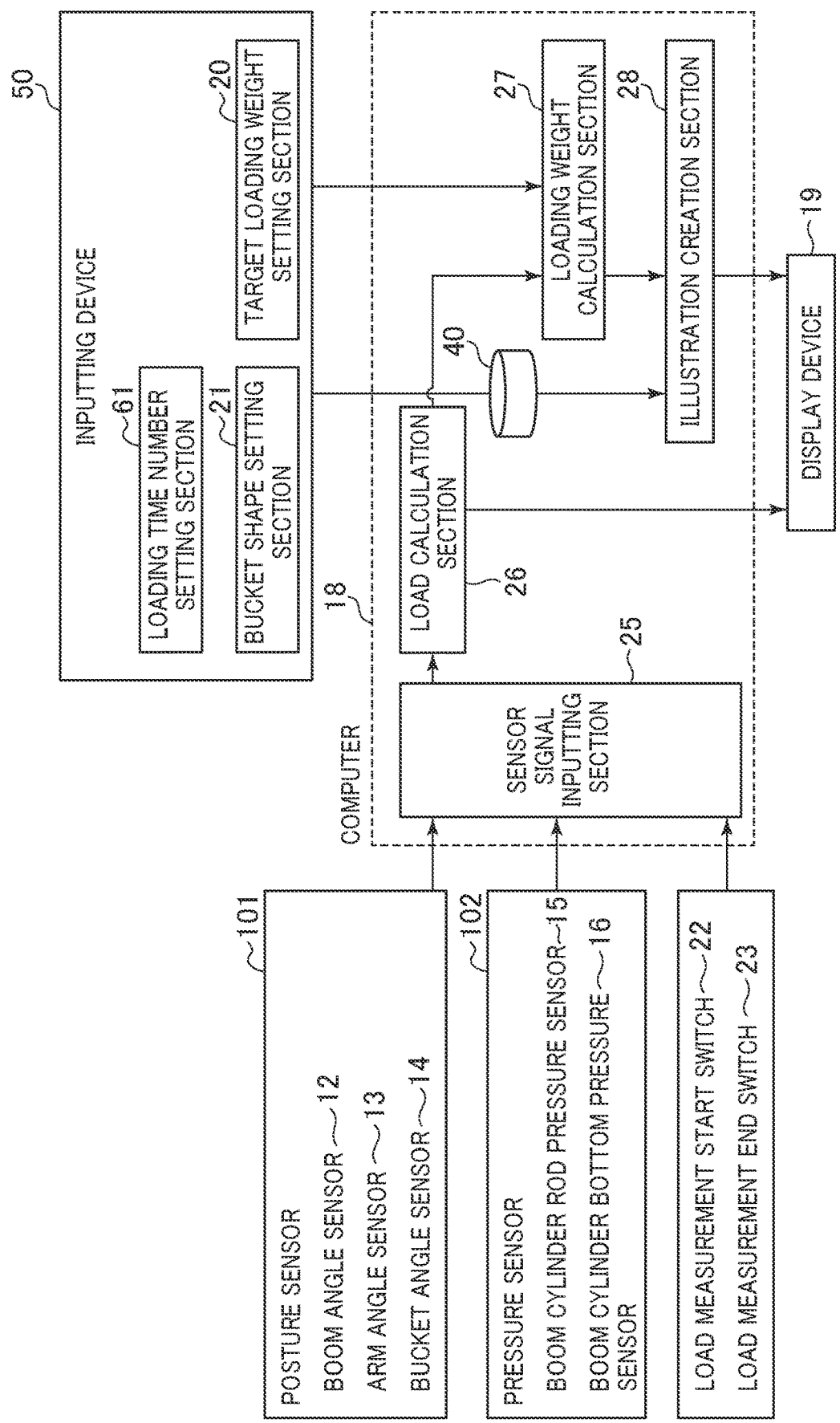
FIG. 2 is a system block diagram of the load measurement system for a construction machine according to the present invention.

One of construction machines according the embodiments of the present invention is described with reference to FIGS. 1 and 2. In the present embodiment, a case is described in which a hydraulic excavator is utilized as the construction machine. FIG. 1 is a side elevational view of the hydraulic excavator to which a load measurement system for a construction machine according to the present embodiment is applied. In the present embodiment, a case is described in which a bucket is used as an attachment to be attached to the arm distal end of a front work implement of a hydraulic excavator and a work of excavating earth and sand (working objects) by the bucket and loading the earth and sand (a loading work) into the cargo bed of a dump track (a hauling vehicle), is repetitively performed.

Referring to FIG. 1, the hydraulic excavator 1 includes a lower track structure 2 having a pair of left and right crawler type track devices provided thereon, an upper swing structure 3 mounted to swing at an upper portion of the lower track structure 2 with a swing device 11 interposed therebetween, a front work implement 4 attached to an upper portion of the upper swing structure 3 rocking in an upward and downward direction, and a cab 17 carried on the upper swing structure 3 for being seated by an operator.

The front work implement 4 includes a boom 5 attached rock in an upward and downward reaction to the upper swing structure 3, an arm 6 attached rocking motion to the distal end of the boom 5, a bucket 7 attached pivotably to the distal end of the arm 6, a boom cylinder 8 (a hydraulic cylinder) for rocking the boom 5 upwardly and downwardly, an arm cylinder 9 (a hydraulic cylinder) for rocking the arm 6, and a bucket cylinder 10 (a hydraulic cylinder) for pivoting the bucket 7. The boom 5 is connected to a bracket provided at a front central portion of the upper swing structure 3 through a pin and is supported to rock around a fulcrum at the connection portion.

Further, on the upper swing structure 3, a controller (control apparatus) 18 for performing various calculations in the load measurement system of the present embodiment, a display device 19 that displays a calculation result by the controller 18 and so forth, an inputting device 50 for allowing an operator to perform inputting of information to the controller 18, a load measurement start switch 22 for starting a series of processes by the load measurement system of the present embodiment and a load measurement end switch 23 for ending the series of processes by the load measurement system of the present embodiment.

The controller 18 has a function for calculating a weight of working objects in the bucket 7, which is executed by a load calculation section 26 (see FIG. 2) and hereinafter described, and the display device 19 displays the weight of the working objects calculated by the controller 18.

The display device 19, the inputting device 50, the load measurement start switch 22 and the load measurement end switch 23 can be installed in the cab 17. The controller 18 may be installed in the cab 17 or may be installed at an arbitrary place outside the cab 17.

On the front work implement 4, a posture sensor 101 and a pressure sensor 102 individually configured from various sensors are provided. The posture sensor 101 is a device for detecting the posture of the front work implement 4 and is configured from a boom angle sensor 12 for detecting the angle of the boom 5 with respect to the upper swing structure 3, an arm angle sensor 13 for detecting the angle of the arm 6 with respect to the boom 5 and a bucket angle sensor 14 for detecting the angle of the bucket 7 with respect to the arm. Meanwhile, the pressure sensor 102 is configured from a boom bottom cylinder pressure sensor 15 for detecting the hydraulic fluid pressure in the cylinder on the bottom side of the boom cylinder 8 and a boom rod cylinder pressure sensor 16 for detecting the hydraulic fluid pressure in the cylinder on the rod side of the boom cylinder 8, and a load acting upon the boom cylinder 8 is detected on the basis of the hydraulic fluid pressures detected by the sensors 15 and 16.

Now, while FIG. 1 described above is referred to, a system configuration of the load measurement system of the present embodiment is described with reference to FIG. 2. FIG. 2 is a system block diagram of the load measurement system of the present embodiment. It is to be noted that like elements to those of FIG. 1 are denoted by like reference numerals and description of them is sometimes omitted (this similarly applies also the other figures). The load measurement system of FIG. 2 includes a controller 18, an inputting device 50, a display device 19, a posture sensor 101, a pressure sensor 102, a load measurement start switch 22 and a load measurement end switch 23.

The inputting device 50 is, for example, ten keys, a touch panel, a keyboard and so forth and includes a target loading weight setting section 20 for performing input setting of a target loading weight P that is a target value of the total weight of working objects to be loaded into a dump track, a bucket shape setting section 21 for performing input setting of bucket shape information indicative of a shape of the bucket 7, and a loading time number setting section 61 for performing inputting of a set loading time number n indicative of a loading time number (a number of times of a loading work) required for the hydraulic excavator 1 before the weight of working objects to be loaded into the dump truck reaches the target loading weight P. From the point of view of maximization of the efficiency of the loading work, preferably the maximum loading weight of the dump truck to be used in the loading work is set to the target loading weight P. The bucket shape information includes information necessary to define a shape of the bucket 7 as a vessel mounted on the front work implement 4 and can include, for example, dimension information including outer dimensions and inner dimensions of the bucket 7, a cross sectional shape and a cross sectional area perpendicular to a bucket widthwise direction and a bucket widthwise direction length, a maximum weight, a maximum capacity and so forth of working objects capable of being loaded into the bucket 7 and so forth. It is to be noted that, in the case where an identifier is set for each of types of buckets and bucket shape information is stored in a tied relationship with each identifier in the controller 18 (a storage device 40), a bucket shape may be set indirectly by inputting an identifier of the bucket 7 of the front work implement 4 as bucket shape information. Such information as the target loading weight P, set loading time number n, bucket shape information and so forth inputted through the inputting device 50 are inputted to the controller 18.

The controller 18 includes a storage device 40 configured from a semiconductor memory (for example, a ROM or a RAM) or a magnetic storage device (a HDD), and a processor not depicted (for example, a CPU or an MPU), and functions as a sensor signal inputting section 25, a load calculation section 26, a loading weight calculation section 27 and an illustration creation section 28.

The sensor signal inputting section 25 receives, as inputs thereto, output signals of the sensors of the posture sensor 101 and the pressure sensor 102 provided on the front work implement 4, an output signal of the load measurement start switch 22 and an output signal of the load measurement end switch 23, and the controller 18 (a processor) converts the format of the input signals into a format necessary for the load calculation section 26 to perform calculation.

The load calculation section 26 calculates, during action of the front work implement 4, an actual loading weight $W_k$ that is the weight of working objects (earth and sand, ore or the like) in the bucket 7 during transportation on the basis of signals from the sensors of the posture sensor 101 and the pressure sensor 102, and outputs the calculated actual loading weight $W_k$ to the display device 19 and the loading weight calculation section 27. As the calculation method of the actual loading weight $W_k$, the calculation method of a working object weight W in an embodiment 1 of Japanese Patent No. 6042358 is available. In the calculation method of this document, the weight W is calculated on the basis of the weight of the front work implement 4 itself, supporting force of the boom cylinder 8 calculated from detection values of the pressure sensors 15 and 16, a horizontal length between the boom rocking motion center and the bucket gravity center position calculated from detection values of the sensors 12, 13 and 14 and a horizontal length between the boom rocking motion center calculated from the detection values of the sensors 12, 13 and 14 and the gravity center position of the front work implement 4 excluding the boom cylinder 8. However, the calculation method of the actual loading weight $W_k$ is not restrictive, and a known method that can calculate the working object weight W of working objects in the bucket 7 being transported can be utilized.

The loading weight calculation section 27 is an element that executes a process for calculating an appropriate loading weight $W_a$, which is an appropriate value of the weight of working objects to be loaded into a dump truck by a next time loading work by the hydraulic excavator 1. The loading weight calculation section 27 in the present embodiment first calculates a remaining loading weight $P_a$ and a remaining loading time number n. The remaining loading weight $P_a$ is a value obtained by subtracting an integrated value ($\Sigma W_k$, where k, =1, 2, 3, . . . ) of the actual loading weight $W_k$ that is the weight of working objects loaded already in the dump truck from the target loading weight P ($P_a = P - \Sigma W_k$). k indicates a number of times of a loading work having been performed for the dump truck, and the remaining loading time number n is a value obtained by subtracting k from the set loading time number (an initial value of n) inputted by the loading time number setting section 61. Then, the loading weight calculation section 27 divides the remaining loading weight $P_a$ by the remaining loading time number n to calculate the appropriate loading weight $W_a$ that is an appropriate value of the weight of the working objects to be loaded into the dump truck by the next time loading work by the hydraulic excavator 1 ($W_a = P_a/n$). In the case where the appropriate loading weight $W_a$ is higher than a bucket maximum weight $W_{cap}$ of the working objects that can be loaded into the bucket 7, the remaining loading time number n may be incremented by one to calculate the appropriate loading weight $W_a$ again. In this case, it is preferable to repeat this process until the appropriate loading weight $W_a$ becomes lower than the bucket maximum weight $W_{cap}$. The appropriate loading weight $W_a$ calculated by the loading weight calculation section 27 is outputted to the illustration creation section 28.

Figure 4:
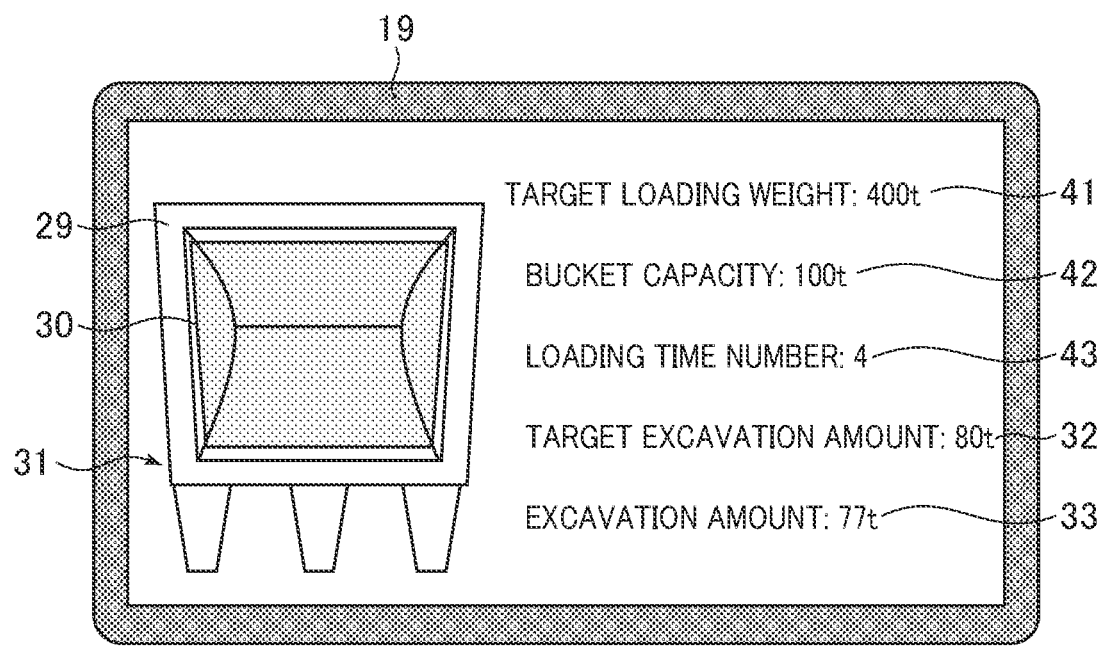
FIG. 4 is an example of an appearance view of the display screen of a display device according to the present invention.

The illustration creation section 28 creates an appropriate amount illustration 30 (see FIG. 4), which is an illustration of a state at which working objects of the appropriate loading weight $W_a$ are loaded into the bucket 7 having a predetermined posture (hereinafter referred to sometimes as "specific posture") and which illustrates the state of working objects in the bucket 7, on the basis of the appropriate loading weight $W_a$ and the bucket shape information. In the present embodiment, taking how the operator in the cab 17 sees the bucket 7 into consideration, a state in which the opening face of the bucket 7 is held substantially horizontally is set as the specific posture as depicted in FIG. 4. In the present specification, the illustration of the bucket 7 having the specific posture is referred to as bucket illustration 29, and an illustration where the appropriate amount illustration 30 is superimposed on the bucket illustration 29 is referred to as target illustration 31. Further, the illustration creation section 28 creates the bucket illustration 29 on the basis of the bucket shape information, creates the target illustration 31 from the bucket illustration 29 and the appropriate amount illustration 30, and outputs information for displaying the target illustration 31 as a screen image to the display device 19.

FIG. 4 is an example of an appearance view of the display screen of the display device 19 in the present embodiment. Display of the load measurement system of the present embodiment is described with reference to FIG. 4. The display device 19 displays the appropriate loading weight $W_a$ calculated by the loading weight calculation section 27 as a target excavation amount 32, displays the target illustration 31 created by the illustration creation section 28 (the illustration in which the bucket illustration 29 and the appropriate amount illustration 30 are displayed in a superimposed relationship), and displays the actual loading weight $W_k$ calculated by the load calculation section 26 as an excavation amount 33. Further, the target loading weight P inputted through the target loading weight setting section 20 is displayed as a target integrated weight 41, and the set loading time number n inputted through the loading time number setting section 61 is displayed as a loading time number 43. Although, in a bucket capacity 42 in FIG. 4, a maximum weight $W_{cap}$ of working objects capable of being loaded into the bucket 7, which is calculated on the basis of the bucket shape information and the density $\rho 1$ of the working objects inputted through the bucket shape setting section 21, is displayed for the convenience of illustration, a maximum capacity of working objects that can be loaded into the bucket 7 may be displayed with reference to the display of "bucket capacity."

It is to be noted that the display device 19 may be made function as the inputting device 50 by configuring the display device 19 from a touch panel such that a touch with the target integrated weight 41 on the screen image causes transition to an input screen image of the target loading weight P. Similarly, a touch with the bucket capacity 42 may cause transition to an input screen image for bucket shape information, and a touch with the loading time number 43 may cause transition to an input screen image for the set loading time number n.

Now, a flow of calculation in the load measurement system of the present embodiment is described with reference to a flow chart depicted in FIG. 3. If the load measurement start switch 22 is depressed by an operator, then the controller 18 starts a series of processes of FIG. 3 (step S101). At step S102, a target loading weight P and a loading time number n of a dump truck of a transport destination set by the operator are inputted through the target loading weight setting section 20 and the loading time number setting section 61. At step S103, bucket shape information set by the operator is inputted through the bucket shape setting section 21.

At step S104, the illustration creation section 28 creates a bucket illustration 29 (an illustration of the bucket 7 having the specific posture) on the basis of the bucket shape information inputted at step S103. The program may be configured otherwise such that, in the case where the shape of the bucket 7 mounted on the front work implement 4 is known in advance, the inputting of bucket shape information at step S103 is omitted and the bucket illustration 29 stored in advance in the storage device 40 is utilized in later processing.

At step S105, the loading weight calculation section 27 calculates an appropriate loading weight $W_a$. In a first operation cycle before working objects are loaded into a dump truck, a value obtained by dividing the target loading weight P inputted at step S102 by the loading time number inputted at step S102 similarly is determined as the appropriate loading weight $W_a$.

At step S106, it is decided whether or not the appropriate loading weight $W_a$ calculated at step S105 is smaller than the bucket maximum weight $W_{cap}$ of the working objects capable of being loaded into the bucket 7. Here, in the case where the appropriate loading weight $W_a$ is smaller than the bucket maximum weight $W_{cap}$ (in the case of YES), the processing advances to step S107. On the contrary, in the case where the appropriate loading weight $W_a$ is equal to or greater than the bucket maximum weight $W_{cap}$ (in the case of NO), since this indicates that the working objects (earth and sand) cannot fit in the bucket 7, the loading time number n is incremented by one at step S119, and the processing returns to step S105, at which the appropriate loading weight $W_a$ is calculated again.

At step S107, the illustration creation section 28 creates an appropriate amount illustration 30 on the basis of the bucket shape defined from the bucket shape information and the appropriate loading weight $W_a$ calculated at step S105. The illustration creation section 28 in the present embodiment first divides, upon creation of the appropriate amount illustration 30, the appropriate loading weight $W_a$ by the density $\rho 1$ of the working objects set in advance to calculate an appropriate loading capacity $V_a$. Then, the illustration creation section 28 defines the shape of the bucket 7 as a vessel on the basis of the bucket shape information inputted at step S103 and creates the appropriate amount illustration 30 on the basis of how the working objects in the bucket 7 when the working objects by the appropriate loading capacity $V_a$ are placed in the bucket 7 having the specific posture are seen (the appearance of the working objects). In the present embodiment, a quadrangle that appears by crossing of the surface of working objects at the time of placing the working objects of the appropriate loading capacity $V_a$ into the bucket 7 having the specific posture, with the inner side face of the bucket 7 is the appropriate amount illustration 30 as depicted in FIG. 4, and the working objects at the time are displayed translucently such that the bucket bottom face in the bucket illustration 29 is made visible.

At step S109, the illustration creation section 28 creates a target illustration 31 by superimposition of the bucket illustration 29 and the appropriate amount illustration 30. Then at step S110, the target illustration 31 is displayed on the display device 19. Consequently, it is possible to allow the operator in the cab 17 to intuitively grasp by what degree the working objects are to be placed into the bucket 7 by a next time excavation work.

At step S111, the load calculation section 26 calculates an actual loading weight $W_k$ on the basis of signals inputted from the posture sensor 101 and the pressure sensor 102, and at step S112, the value of the actual loading weight $W_k$ is displayed as an excavation amount 33 on the display device 19.

At step S113, the posture of the front work implement 4 is detected from the input signal of the posture sensor 101, and it is decided whether or not the front work implement 4 is performing a bucket dumping action. Here, in the case where a bucket dumping action is detected, it is considered that soil discharging action to the dump truck is being performed, and the processing advances to step S114, at which the remaining loading time number is decremented by one. It is to be noted that, although, in the present embodiment, it is decided by detection of a bucket dumping action whether or not a soil discharging action is performed, carrying out of a soil discharging action into the dump truck may be decided by detecting a swinging action in an approaching direction to the dump truck, a change of the actual loading weight $W_k$ in the bucket 7, a change of the loading weight into the dump truck or the like.

At step S115, it is decided whether or not the remaining loading time number reaches zero. Here, in the case where the remaining loading time number is not zero, the processing advances to step S116, at which the integrated loading weight $\Sigma W_k$ is calculated by the load calculation section 26.

At step S117, the loading weight calculation section 27 calculates the remaining loading weight $P_a$ ($P_a = P - \Sigma W_k$). For example, in the case where a loading work is completed once, $P_a$ becomes $P_a = P - W_1$.

At step S118, k is incremented by 1, and at step S105, the appropriate loading weight $W_a$ is calculated again. For example, in the case where the appropriate loading weight $W_a$ is calculated for the second time, $W_a = (P - W_1)/(n-1)$ is calculated (n in this expression is the value inputted by the loading time number setting section 61).

On the other hand, in the case where the remaining loading time number is zero at step S115, k is set to the initial value 1 at step S120 and the processing of the flow chart is ended (step S121).

According to the load measurement system configured in such a manner as described above, an illustration (the target illustration 31) indicative of a state in which working objects of an appropriate loading weight $W_a$ are placed in the bucket 7 having a predetermined posture (the specific posture) on the basis of a value (an appropriate loading capacity $V_a$) obtained by conversion of the appropriate loading weight $W_a$ into a capacity (volume) and the shape of the bucket 7 as a vessel mounted currently, and this illustration is displayed on the display device 19. Therefore, the operator can intuitively grasp by what capacity the working objects are to be placed into the bucket 7 by a next time loading work. Since this makes it possible to easily make the loading weight of a dump truck closer to the target loading weight P (for example, a maximum loading weight), the working efficiency can be improved.

Further, in the embodiment described above, since the appropriate loading weight $W_a$ and the loading time number are corrected in response to the integrated value ($\Sigma W_k$) of the actual loading weight $W_k$, even if the working objects of a weight different from the initial appropriate loading weight $W_a$ are loaded in the middle of a loading work, the final loading weight of the dump truck can be made closer to the target loading weight P.

Now, another embodiment of the present invention is described. In the present embodiment, bucket illustrations according to bucket shape information are stored in the storage device 40 in advance, and appropriate amount illustrations 30 of buckets each corresponding to the respective ratios $W_b$ that are ratios of the appropriate loading weight to a maximum weight (hereinafter referred to "bucket capacity" for the convenience of description) $W_{cap}$ of working objects that can be loaded into the bucket are stored in advance in the storage device 40. In particular, a plurality of appropriate amount illustrations 30 according to bucket shapes and the ratios $W_b$ are stored in the storage device 40. The hardware configuration of the other part is same as that depicted in FIGS. 1 and 2, and also the screen image of the display device 19 is same as that of FIG. 4.

Figure 5:
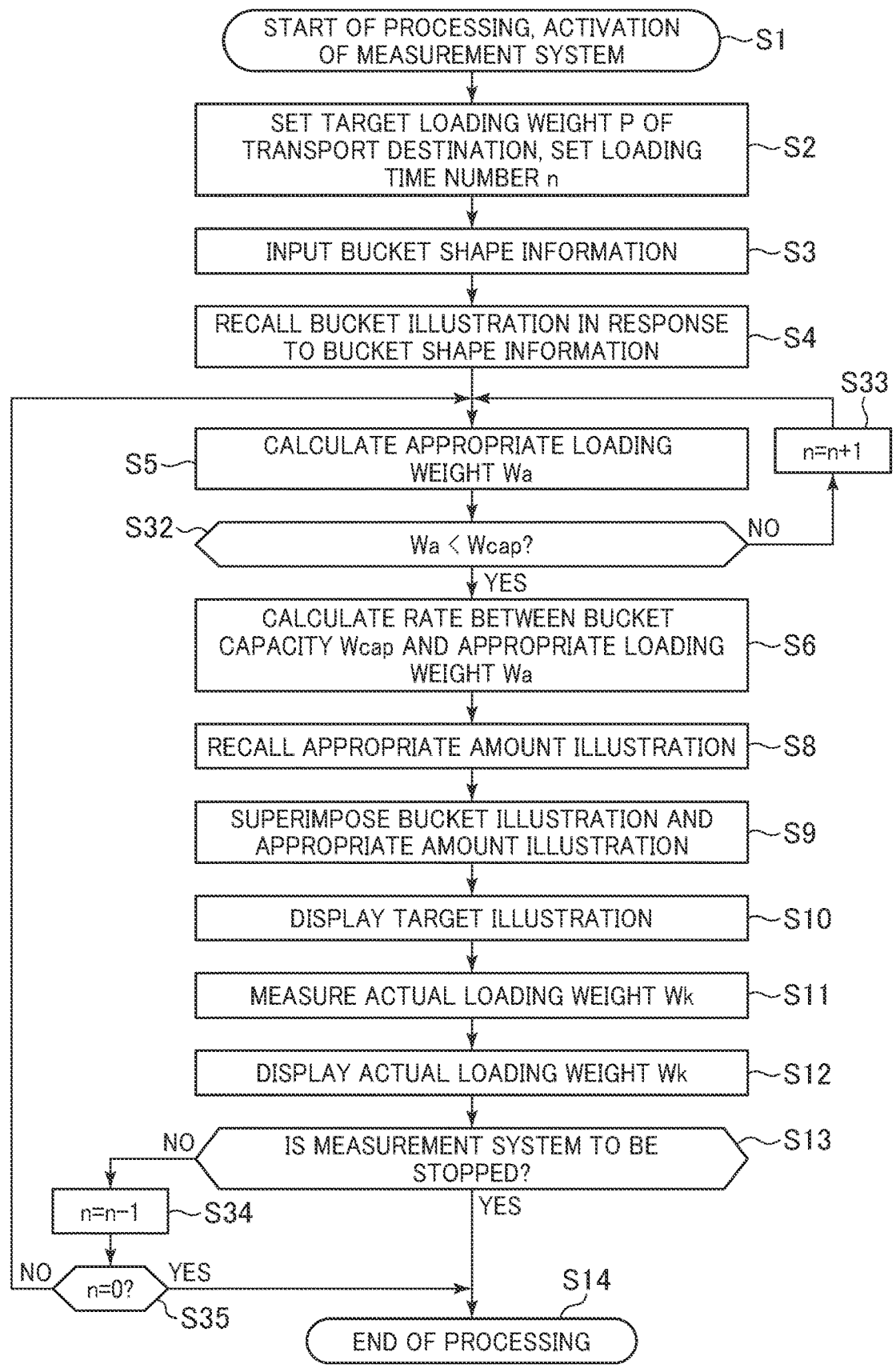
FIG. 5 is a flow chart of calculation by another load measurement system according to the present invention.

In the following, a flow of calculation of the load measurement system in the present embodiment is described with reference to a flow chart depicted in FIG. 5. If the load measurement start switch 22 is depressed by the operator, then the controller 18 starts processing of FIG. 5 (step S1). At step S2, the target loading weight setting section 20 and the loading time number setting section 61 input a target loading weight P and a loading time number n for a dump truck.

At step S3, bucket shape information set by the operator is inputted through the bucket shape setting section 21. At step S4, the illustration creation section 28 recalls a bucket illustration 29 according to the bucket shape information inputted at step S103, from the storage device 40.

At step S5, the loading weight calculation section 27 calculates an appropriate loading weight $W_a$. Then at step S32, it is decided whether or not the appropriate loading weight $W_a$ is smaller than the bucket capacity $W_{cap}$. For the bucket capacity $W_{cap}$, a value suitable as the bucket capacity of the bucket 7 at present is selected on the basis of the bucket shape information from within the storage device 40. Here, in the case where it is decided that the appropriate loading weight $W_a$ is smaller than the bucket capacity $W_{cap}$, the processing advances to step S6. On the contrary, in the case where it is decided that the appropriate loading weight $W_a$ is equal to or greater than the maximum weight $W_{cap}$, the loading time number n is increased by one at step S33, whereafter the processing returns to step S5 to calculate the appropriate loading weight $W_a$ again.

At step S6, the illustration creation section 28 calculates the ratio $W_b$ between the bucket capacity $W_{cap}$ and the appropriate loading weight $W_a$, and at step S8, the illustration creation section 28 recalls an appropriate amount illustration 30 according to the ratio $W_b$ from the storage device 40.

At step S9, the illustration creation section 28 superimposes the bucket illustration 29 recalled at step S4 and the appropriate amount illustration 30 recalled at step S8 to create a target illustration 31 and outputs the target illustration 31 to the display device 19, and at step S10, the target illustration 31 is displayed on the screen of the display device 19.

At step S11, the load calculation section 26 calculates an actual loading weight $W_k$ on the basis of signals inputted from the posture sensor 101 and the pressure sensor 102, and at step S12, the value of the actual loading weight $W_k$ is displayed as the excavation amount 33 on the display device 19.

At step S13, it is decided whether or not the load measurement end switch 23 is depressed. In the case where the load measurement end switch 23 is depressed (in the case of YES), load measurement is to be stopped and the processing advances to step S14, at which the processing for load measurement is ended. On the contrary, in the case where the load measurement end switch 23 is not depressed (in the case of NO), the remaining loading time number is decremented by one at step S34. Then at step S35, it is decided whether or not the remaining loading time number n is zero, and in the case where the remaining loading time number is 0 (in the case of YES), the processing advances to step S14, at which the processing ended. On the other hand, in the case where the remaining loading time number is any other than zero (in the case of NO), the processing returns to step S5 to repeat the succeeding processes.

Figure 3:
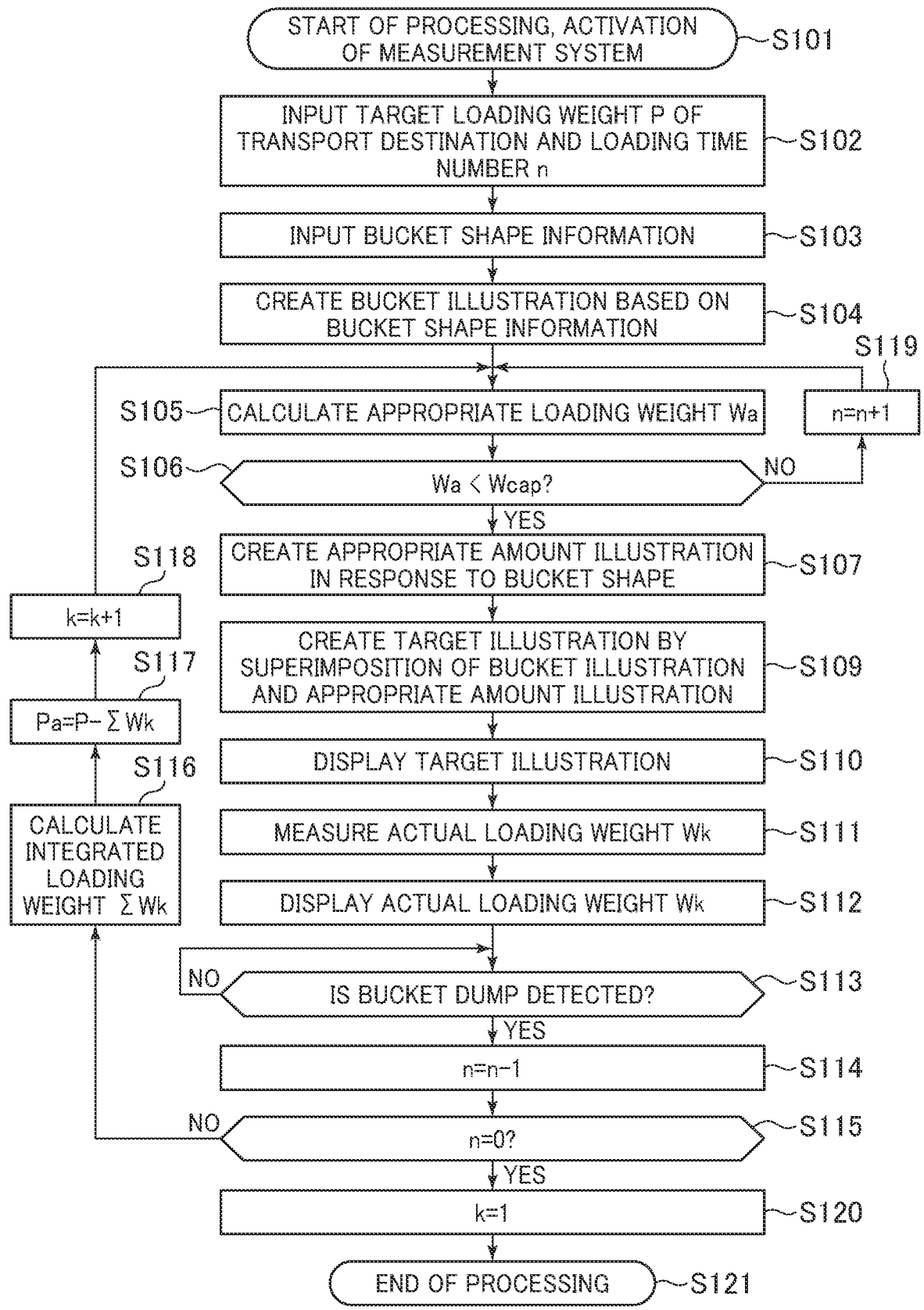
FIG. 3 is a flow chart of calculation by the load measurement system according to the present invention.

It is to be noted that the flow may be configured otherwise such that, in the case where the decision at step S13 is NO, by executing step S113 of FIG. 3 before the processing advances to step S34, it is decided whether or not loading of the working objects into the dump truck is completed, and after it is decided as YES here, the processing advances to step S34.

Also in the embodiment configured in such a manner as described above, the operator can intuitively grasp by what capacity working objects are to be placed into the bucket 7 by a next time loading work. Especially, in the present embodiment, since bucket illustrations 29 prepared according to bucket shape information and appropriate amount illustrations 30 of buckets each prepared for individual bucket capacities $W_{cap}$ and ratios $W_b$ of the appropriate loading weight are stored in the storage device 40 in advance, it is a merit that the calculation load to the controller 18 involved in creation of a bucket illustration 29 and an appropriate amount illustration 30 (in short, creation of a target illustration 31) can be reduced significantly from that of the example of FIG. 3.

It is to be noted that the bucket capacity $W_{cap}$ not only can be inputted as bucket shape information through the bucket shape setting section 21 but also can be calculated from other bucket shape information and besides can be stored in advance in the storage device 40 for each of types of the buckets 7 and recalled on the basis of bucket shape information. This similarly applies also to the other embodiments that utilize the bucket capacity $W_{cap}$.

Figure 6:
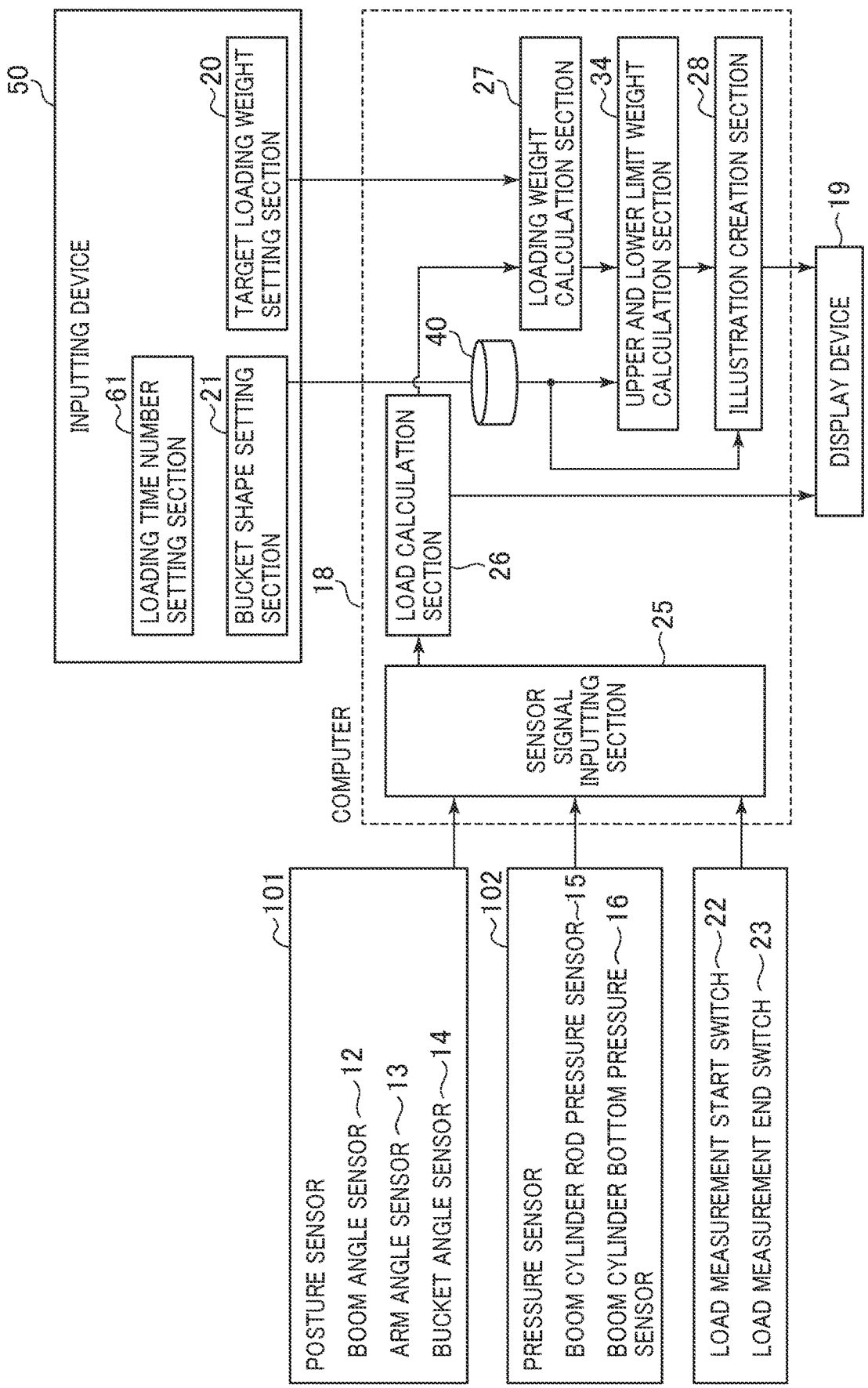
FIG. 6 is a system block diagram of a further load measurement system for a construction machine according to the present invention.
Figure 7:
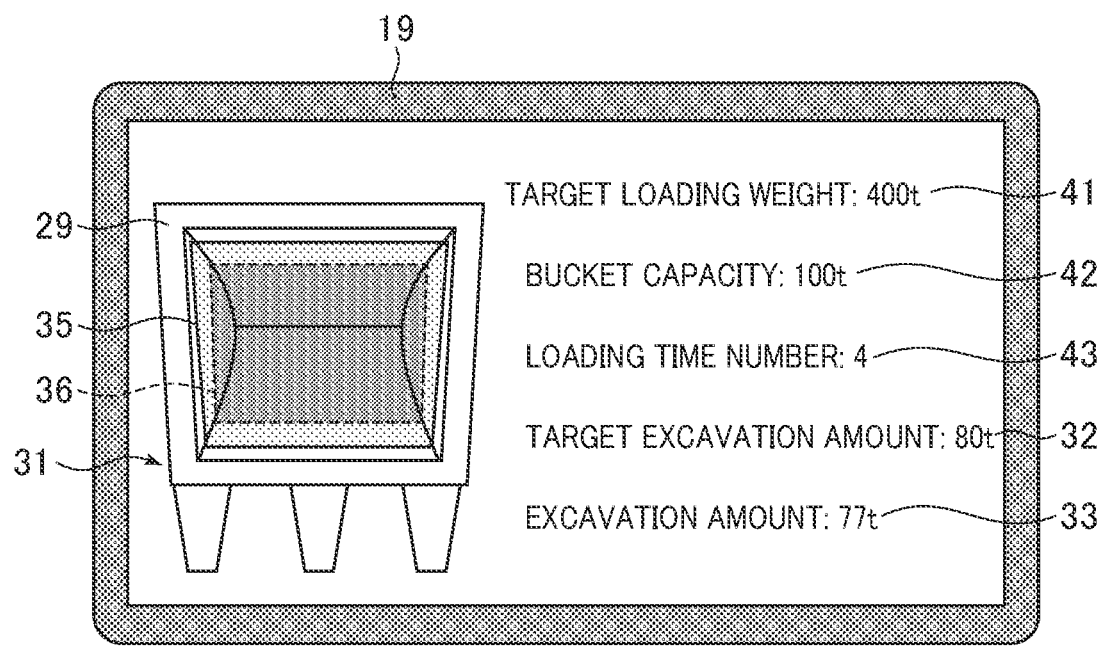
FIG. 7 is an example of an appearance view of the display screen of a display device according to the present invention.
Figure 8:
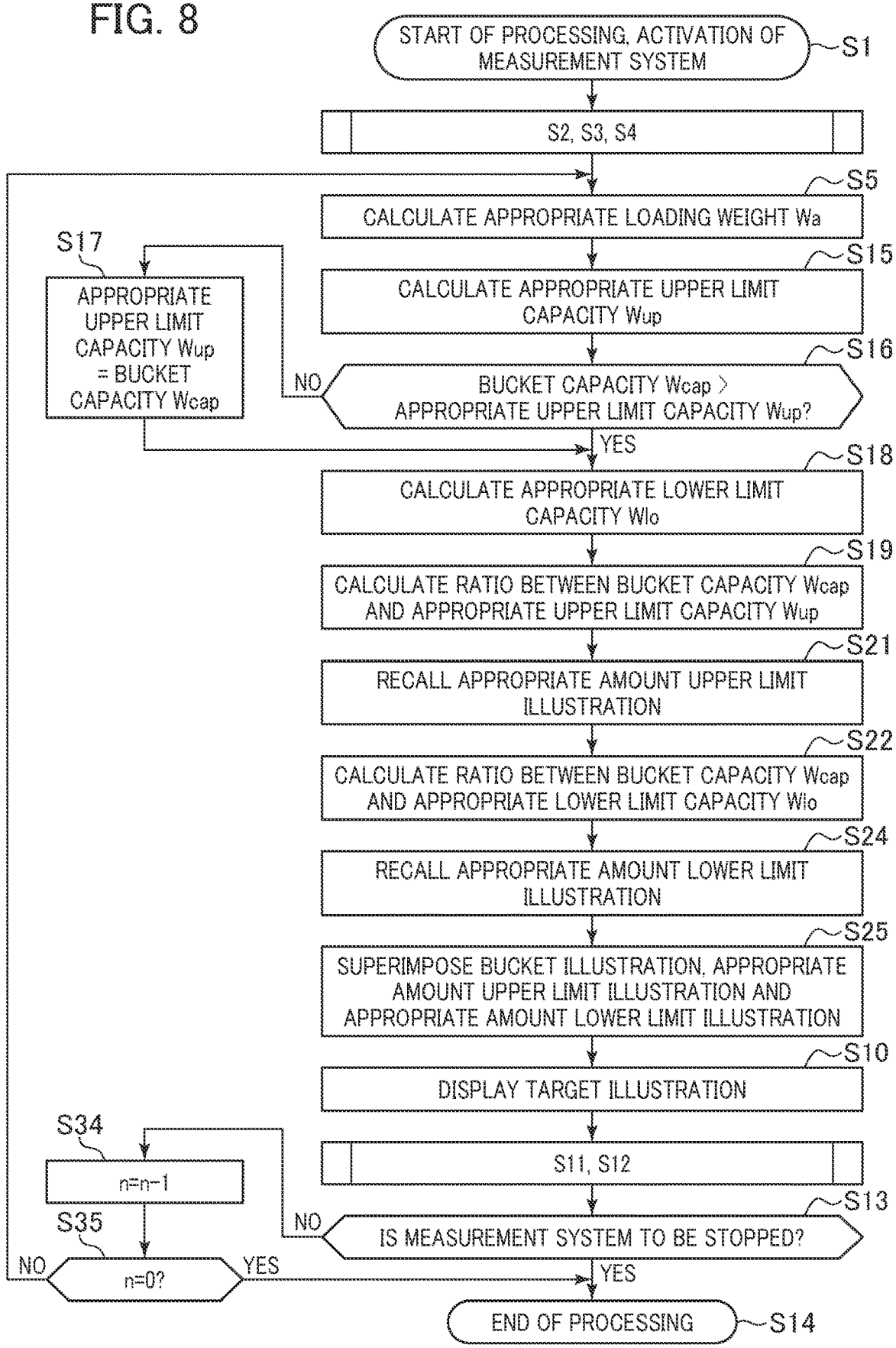
FIG. 8 is a flow chart of calculation by the load measurement system according to the present invention.

Now, a further embodiment of the present invention is described. FIG. 6 is a system block diagram of a further load measurement system of the present invention; FIG. 7 is an appearance view of the display screen of a display device 19 of the present embodiment; and FIG. 8 is a flow chart of calculation processing in the load measurement system of the present embodiment. In those figures, like elements and like steps to those in the preceding figures are denoted by like reference characters. In the following description, description of like elements and like steps to those described hereinabove is omitted, and description is given focusing on differences.

First, description is given with reference to FIG. 6. The controller 18 in the present embodiment functions as an upper and lower limit weight calculation section 34. Also in the present embodiment, bucket illustrations according to bucket shape information are stored in advance in the storage device 40, and an appropriate amount illustration of each bucket is stored in the storage device 40 for each of ratios $W_b$ between maximum weights (bucket capacities) $W_{cap}$ and appropriate loading weights of working objects capable of being loaded into the bucket.

The upper and lower limit weight calculation section 34 calculates an appropriate upper limit weight $W_{up}$, which is an allowable upper limit value of the weight of working objects to be loaded into a dump truck by a single time loading work on the basis of an appropriate loading weight $W_a$ and an upper limit coefficient $A_{up}$ that is a predetermined value equal to or greater than 1, and calculates an appropriate lower limit weight $W_{lo}$, which is an allowable lower limit value of the weight of working objects to be loaded into a dump truck by a single time loading work, on the basis of the appropriate loading weight $W_a$ and a lower limit coefficient $A_{lo}$ that is a predetermined value equal to or lower than 1.

The upper and lower limit weight calculation section 34 in the present embodiment calculates the appropriate upper limit weight $W_{up}$ in the following manner. First, the upper and lower limit weight calculation section 34 acquires a bucket capacity $W_{cap}$ on the basis of bucket shape information inputted through the bucket shape setting section 21 and receives, as an input thereto, an appropriate loading weight $W_a$ from the loading weight calculation section 27. Then, the upper and lower limit weight calculation section 34 multiplies the input appropriate loading weight $W_a$ by the upper limit coefficient $A_{up}$ to calculate an appropriate upper limit weight $W_{up}$. In the case where the appropriate upper limit weight $W_{up}$ is greater when the appropriate upper limit weight $W_{up}$ and the bucket capacity $W_{cap}$ are compared with each other, the upper and lower limit weight calculation section 34 outputs the bucket capacity $W_{cap}$ as the appropriate upper limit weight $W_{up}$ to the illustration creation section 28. On the contrary, in the case where the bucket capacity $W_{cap}$ is greater, the upper and lower limit weight calculation section 34 outputs the appropriate upper limit weight $W_{up}$ to the illustration creation section 28. It is to be noted that, as the upper limit coefficient $A_{up}$, one or more arbitrary values equal to or greater than 1 can be set and stored in advance in the storage device 40.

Further, the upper and lower limit weight calculation section 34 in the present embodiment calculates the appropriate lower limit weight $W_{lo}$ in the following manner. The upper and lower limit weight calculation section 34 multiplies the appropriate loading weight $W_a$ inputted from the loading weight calculation section 27 by the lower limit coefficient $A_{lo}$ to calculate an appropriate lower limit weight $W_{lo}$ and outputs the appropriate lower limit weight $W_{lo}$ to the illustration creation section 28. It is to be noted that, as the lower limit coefficient $A_{lo}$, one or more arbitrary values equal to or lower than 1 can be stored in advance in the storage device 40.

The illustration creation section 28 calculates an upper limit ratio $W_{bup}$ ($W_{bup}=W_{up}/W_{cap}$) that is a ratio of the appropriate upper limit weight $W_{up}$ to the bucket capacity $W_{cap}$, recalls an appropriate amount illustration 30 according to the upper limit ratio $W_{bup}$ from the storage device 40, and determines the appropriate amount illustration 30 as an appropriate amount upper limit illustration 35. Further, the illustration creation section 28 calculates a lower limit ratio $W_{blo}$ ($W_{blo}=W_{lo}/W_{cap}$) that is a ratio of the appropriate upper limit weight $W_{lo}$ to the bucket capacity $W_{cap}$, recalls an appropriate amount illustration 30 according to the lower limit ratio $W_{bup}$ from the storage device 40 and determines the appropriate amount illustration 30 as an appropriate amount lower limit illustration 36. Then, the illustration creation section 28 superimposes the appropriate amount upper limit illustration 35 and the appropriate amount lower limit illustration 36 on the displayed bucket illustration 29 to create a target illustration 31, outputs the created target illustration 31 to the display device 19 and displays the target illustration 31 on the display device 19.

FIG. 7 is an example of an appearance view of a display screen image of the display device 19 in the present embodiment. The display device 19 in the present embodiment displays the target illustration 31 created by the illustration creation section 28 and having the bucket illustration 29, appropriate amount upper limit illustration 35 and appropriate amount lower limit illustration 36 superimposed therein. In the appropriate amount upper limit illustration 35, a quadrangle that appears when the surface of working objects of the appropriate upper limit weight $W_{up}$ crosses with an inner side face of the bucket 7 is indicated by a solid line, and in the appropriate amount lower limit illustration 36, a similar quadrangle is indicated by a broken line.

Now, a flow of calculation in the load measurement system of the present embodiment is described with reference to a flow chart depicted in FIG. 8. It is to be noted that, at steps S2, S3, S4 and S5, at steps S10, S11, S12 and S13 and at steps S34, S35 and S14 in FIG. 8, processes same as those in FIG. 5 are performed. Also it is possible to configure the flow of calculation such that, after step S5 of FIG. 8, the decision at step S32 of FIG. 5 is performed and, when the decision is NO, step S33 is executed and the processing returns to step S5, but when the decision is YES, the processing advances to step S15.

At step S15, the upper and lower limit weight calculation section 34 multiplies the appropriate loading weight $W_a$ by the upper limit coefficient $A_{up}$ to calculate an appropriate upper limit weight $W_{up}$, and at step S16, it is decided whether or not the appropriate upper limit weight $W_{up}$ is smaller than the bucket capacity $W_{cap}$.

In the case where it is decided at step S16 that the appropriate upper limit weight $W_{up}$ is smaller than the bucket capacity $W_{cap}$ (in the case of YES), the processing advances directly to step S18. On the contrary, in the case where it is decided at step S16 that the appropriate upper limit weight $W_{up}$ is greater than the bucket capacity $W_{cap}$ (in the case of NO), the appropriate upper limit weight $W_{up}$ and the bucket capacity $W_{cap}$ are made equal to each other (step S17), whereafter the processing advances to step S18.

At step S18, the upper and lower limit weight calculation section 34 multiplies the appropriate loading weight $W_a$ by the lower limit coefficient $A_{lo}$ to calculate an appropriate lower limit weight $W_{lo}$.

At step S19, the illustration creation section 28 calculates the ratio $W_{bup}$ between the bucket capacity $W_{cap}$ and the appropriate upper limit weight $W_{up}$, and at step S21, the illustration creation section 28 recalls an appropriate amount illustration 30 corresponding to the ratio $W_{bup}$ as an appropriate amount upper limit illustration 35 from the storage device 40.

Then at step S22, the illustration creation section 28 calculates the ratio $W_{blo}$ between the bucket capacity $W_{cap}$ and the appropriate lower limit weight $W_{lo}$, and at step S24, the illustration creation section 28 recalls an appropriate amount illustration 30 corresponding to the ratio $W_{blo}$ as an appropriate amount lower limit illustration 36 from the storage device 40.

At step S25, the illustration creation section 28 creates a target illustration 31 in which the bucket illustration 29 created at step S4, the appropriate amount upper limit illustration 35 created at step S21 and the appropriate amount lower limit illustration 36 crated at step S24 are superimposed and outputs the target illustration 31 to the display device 19, and at step S10, the target illustration 31 is displayed on the screen of the display device 19. The succeeding processes are same as those of the flow chart of FIG. 5.

Also in the embodiment configured in such a manner as described above, it is possible to allow the operator to intuitively grasp by what capacity the working objects are to be placed into the bucket 7 by a next time loading work. Especially in the present embodiment, since the upper limit weight $W_{up}$ and the lower limit weight $W_{lo}$ are provided for the appropriate loading weight, even in the case where the appropriate loading weight has a predetermined allowable width, the operator can intuitively grasp by what amount the working objects are to be placed into the bucket 7 by a next time excavation work.

It is to be noted that, although, in the present embodiment, an appropriate amount upper limit illustration 35 and an appropriate amount lower limit illustration 36 are recalled from the storage device 40 on the basis of the two ratios $W_{bup}$ and $W_{blo}$, an appropriate amount upper limit illustration 35 and an appropriate amount lower limit illustration 36 may be created on the basis of volumes calculated from the appropriate upper limit weight $W_{up}$ and the appropriate lower limit weight $W_{lo}$, respectively, as in the case of the example of FIG. 3.

Figure 9:
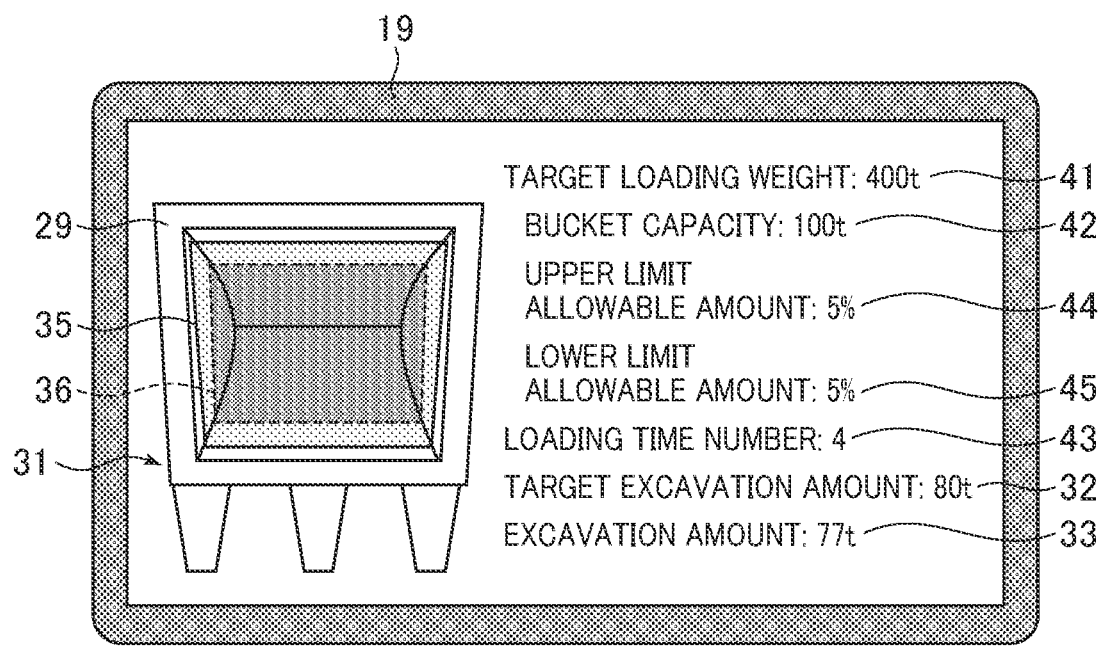
FIG. 9 is an example of an appearance view of the display screen of the display device according to the present invention.

Further, the inputting device 50 is preferably configured such that an upper limit coefficient $A_{up}$ and a lower limit coefficient $A_{lo}$ of values desired by an operator can be inputted. FIG. 9 is an appearance view of a display screen image in the case where the display device 19 is configured from a touch panel in order to use the display device 19 as the inputting device 50. The display screen image of FIG. 9 has an upper limit allowable amount inputting portion 44 and a lower limit allowable amount inputting portion 45. If the upper limit allowable amount inputting portion 44 and the lower limit allowable amount inputting portion 45 are touched by the operator, then a numerical value inputting dialog (not depicted) stands up on the screen to make it possible to input an upper limit allowable amount X and a lower limit allowable amount Y on the screen image. The upper limit coefficient $A_{up}$ and the lower limit coefficient $A_{lo}$ are determined utilizing the inputted values X and Y (integers equal to or greater than zero but equal to or smaller than 100), and relational expressions representing the upper limit coefficient $A_{up}$ and the lower limit coefficient $A_{lo}$ represented by X and Y (particularly, relational expressions of upper limit coefficient $A_{up}=(100+X)/100$ and lower limit coefficient $A_{lo}=(100-Y)/100$). If the system is configured such that the operator can set the upper limit weight $W_{up}$ and the lower limit weight $W_{lo}$ in this manner, then even in the case where the dump truck into which working objects is to be loaded changes and the allowable value of the appropriate loading weight changes, advantages similar to those of the present embodiment can be achieved.

Figure 10:
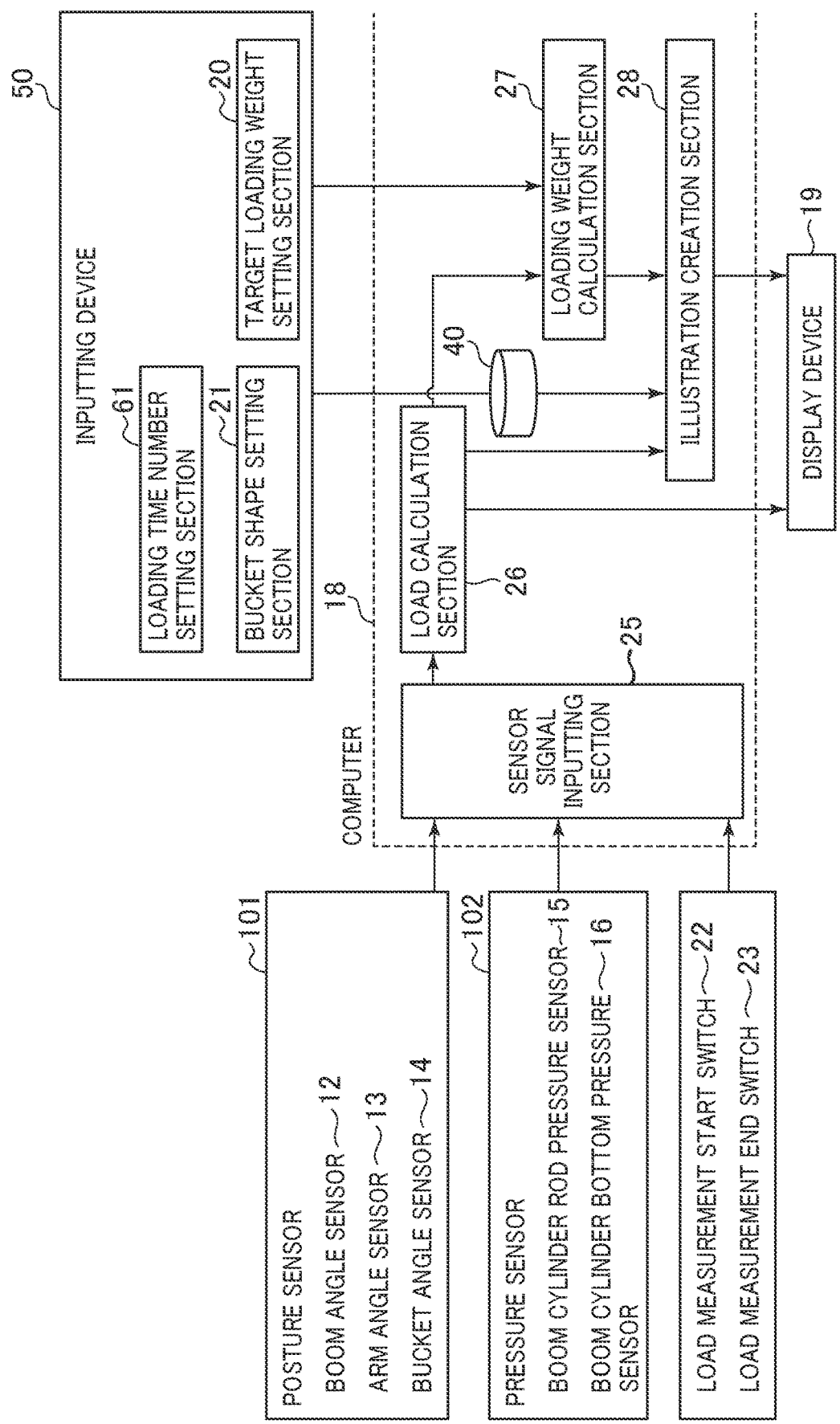
FIG. 10 is a system block diagram of a load measurement system for a construction machine according to the present invention.
Figure 11:
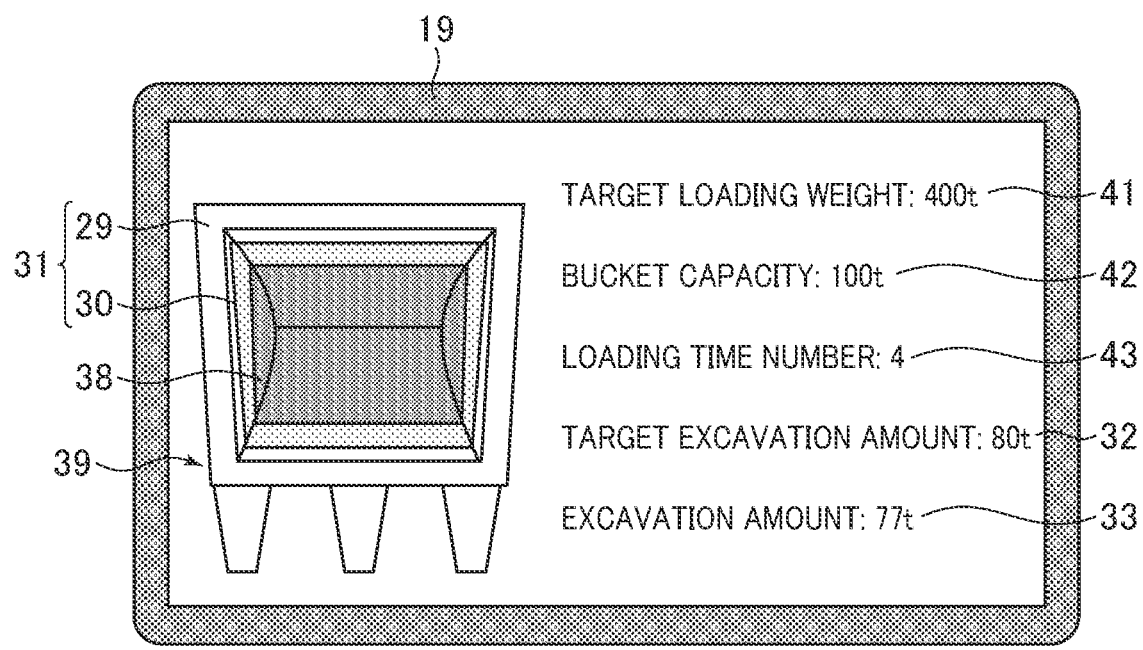
FIG. 11 is an example of an appearance view of the display screen of a display device according to the present invention.
Figure 12:
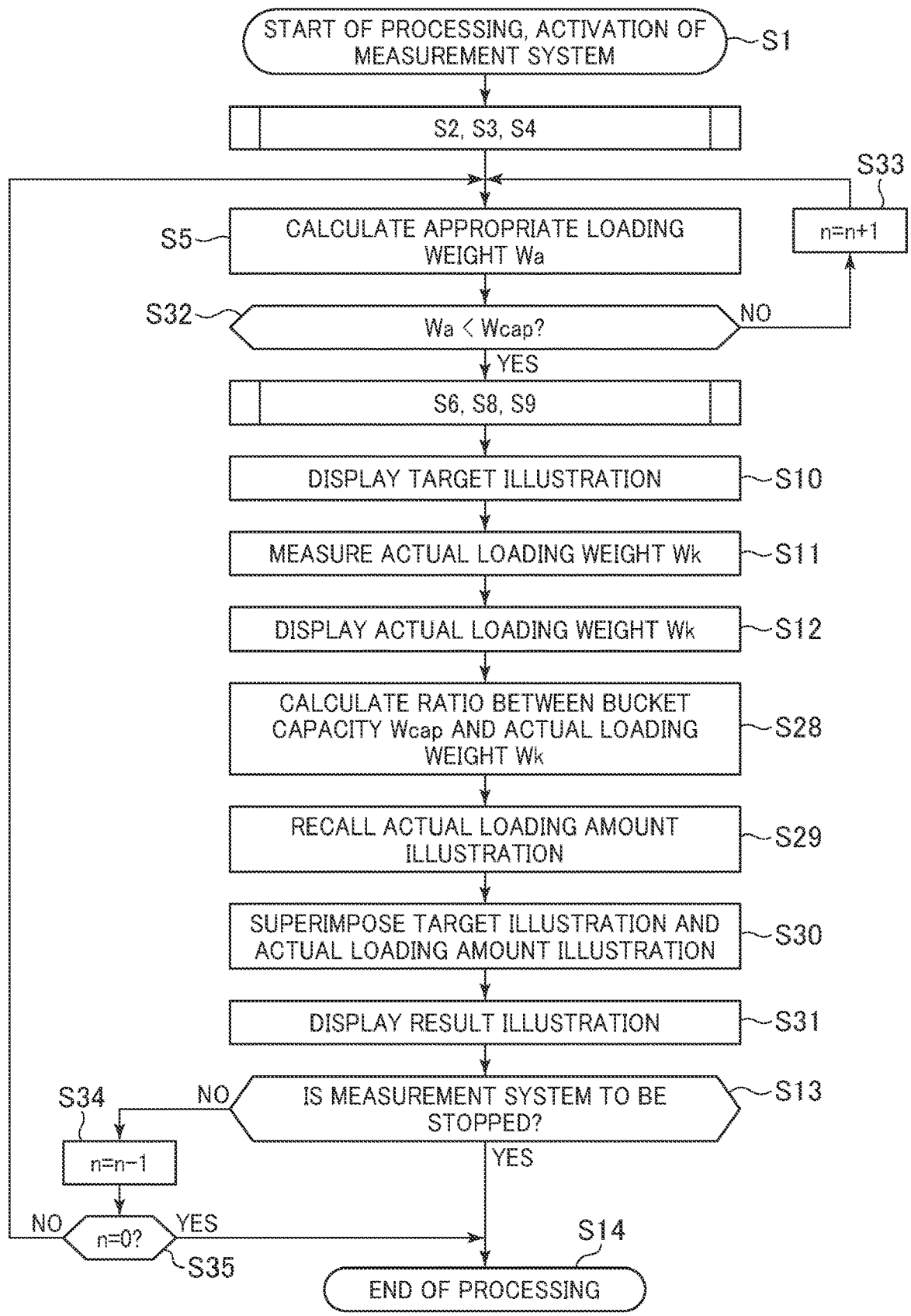
FIG. 12 is a flow chart of calculation by the load measurement system according to the present invention.

Now, a still further embodiment of the present invention is described. FIG. 10 is a system block diagram of a load measurement system of the present embodiment; FIG. 11 is an appearance view of a display screen of a display device 19 in the present embodiment; and FIG. 12 is a flow chart of calculation processing in the load measurement system of the present embodiment. In the following description, description of like elements and like steps to those in the preceding figures denoted by like reference characters is omitted, and description is given focusing on differences.

First, description is given with reference to FIG. 10. Although, in the preceding embodiments, the load calculation section 26 is connected to the display device 19, in the present embodiment, the load calculation section 26 is further connected to the illustration creation section 28. The load calculation section 26 outputs a calculated actual loading weight $W_k$ to the illustration creation section 28.

The illustration creation section 28 calculates a ratio $W_c$ ($W_c=W_k/W_{cap}$) that is a ratio of the actual loading weight $W_k$ to the bucket capacity $W_{cap}$. The illustration creation section 28 reads out an appropriate amount illustration 30 corresponding to the ratio $W_c$ from the storage device 40, determines the appropriate amount illustration 30 as an actual loading amount illustration 38 and outputs a result of superimposition (a result illustration 39) of the actual loading amount illustration 38 on the target illustration 31 (the bucket illustration 29 and the appropriate amount illustration 30) to the display device 19. Consequently, the result illustration 39 is displayed as depicted in FIG. 11 at the display device 19.

FIG. 11 is an example of an appearance view of the display screen of the display device 19 in the present embodiment. The display device 19 in the present embodiment displays a result illustration 39 in which a bucket illustration 29, an appropriate amount illustration 30 and an actual loading amount illustration 38 created by the illustration creation section 28 are superimposed.

Now, a flow of calculation in the load measurement system of the present embodiment is described with reference to a flow chart depicted in FIG. 12. First, processes at step S1 to step S12 same as those of FIG. 5 are performed. Then at step S28, the illustration creation section 28 calculates a ratio $W_c$ ($W_c=W_k/W_{cap}$) that is a ratio of the actual loading weight $W_k$ to the bucket capacity $W_{cap}$, and at step S29, the illustration creation section 28 recalls an appropriate amount illustration 30 corresponding to the ratio $W_c$ as an actual loading amount illustration 38 from the storage device 40. Then at step S30, the illustration creation section 28 superimposes the target illustration 31 and the actual loading amount illustration 38 to create a result illustration 39. At step S31, the display device 19 displays the result illustration 39. Succeeding processes are same as those in the flow chart of FIG. 5.

Also with the embodiment configured in such a manner as described above, it is possible to allow the operator to intuitively grasp by what capacity the working objects are to be placed into the bucket 7 by a next time excavation work. Especially, in the present embodiment, since the appropriate amount illustration 30 indicative of a target value of the working objects and the actual loading amount illustration 38 indicative of an actual amount are displayed together, the accuracy of the loading work (excavating work) of the working objects into the bucket 7 can be fed back immediately to the operator. Consequently, a chance for improvement in skill can be provided to the user, and further, also improvement in working efficiency in the future can be anticipated.

Figure 15:
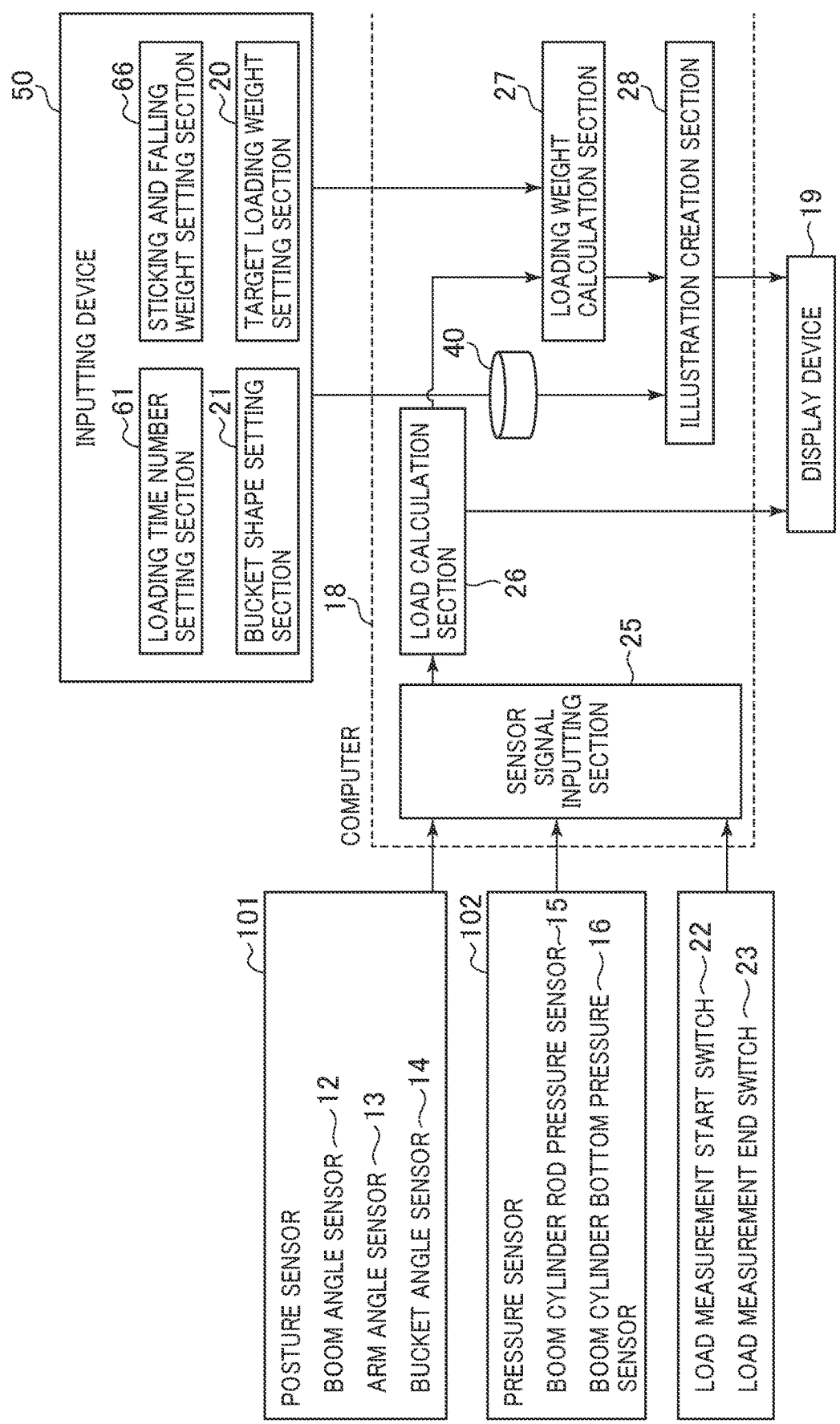
FIG. 15 is a system block diagram of a still further load measurement system for a construction machine according to the present invention.
Figure 16:
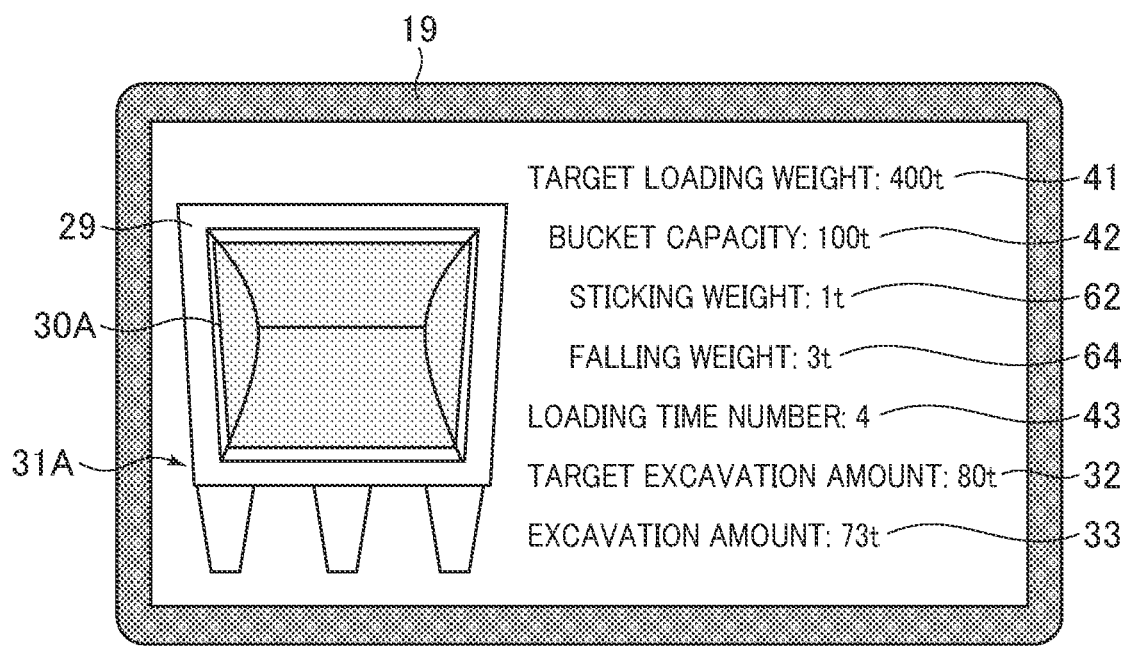
FIG. 16 is an example of an appearance view of a display screen of a yet further display device according to the present invention.
Figure 17:
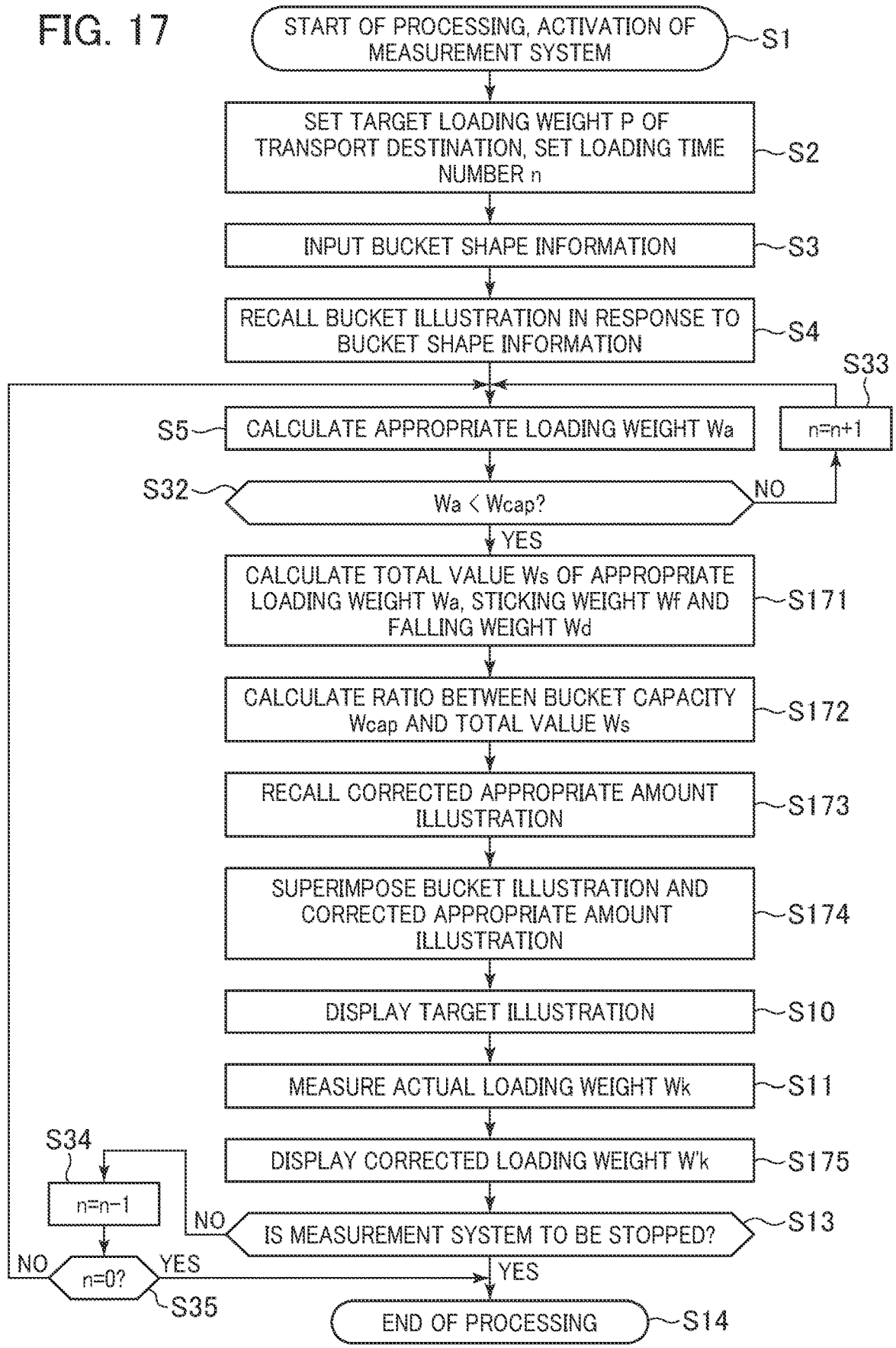
FIG. 17 is a flow chart of calculation by the load measurement system according to the present invention.

Now, a yet further embodiment of the present invention is described. FIG. 15 is a system block diagram of a load measurement system of the present embodiment; FIG. 16 is an appearance view of the display screen of the display device 19 of the present embodiment; and FIG. 17 is a flow chart of calculation processing in the load measurement system of the present embodiment. In the following description, description of like elements and like steps to those in the preceding figures denoted by like reference characters is omitted, and description is given focusing on differences.

First, description is given with reference to FIG. 15. The inputting device 50 in the present embodiment is different from those in the other embodiments in that it functions as a sticking and falling weight setting section 66. The sticking and falling weight setting section 66 is an element for inputting a sticking weight $W_f$ that is the weight of working objects (sticking matters) that stick to and are not discharged from the bucket 7, and a falling weight $W_d$ indicative of the weight of working objects (falling matters) spilling down from the bucket 7 upon loading into a dump truck (for example, during swinging). From the point of view of making the loading weight into a dump truck closer to a target loading weight P, creation of a target illustration 31 and calculation of an actual loading weight $W_k$ taking the weights $W_f$ and $W_d$ of sticking matters and falling matters into consideration is preferable. The sticking weight $W_f$ and the falling weight $W_d$ inputted to the operator through the inputting device 50 (the sticking and falling weight setting section 66) are outputted to the load calculation section 26 and the illustration creation section 28 in the controller 18. It is to be noted that only one of the sticking weight $W_f$ and the falling weight $W_d$ may be inputted, and in the case where only one of them is inputted, it is sufficient if the other is set to zero.

FIG. 16 is an example of an appearance view of the display screen image of the display device 19 in the present embodiment. The display device 19 in the present embodiment displays a target illustration 31A in which a bucket illustration 29 and a corrected appropriate amount illustration 30A created by the illustration creation section 28 are superimposed. Further, the display device 19 in the present embodiment is configured from a touch panel so as to be utilized as the inputting device 50. The display screen of FIG. 16 has a sticking weight inputting section 62 and a falling weight inputting section 63. If the sticking weight inputting section 62 and the falling weight inputting section 63 are touched by the operator, then a numerical value inputting dialog (not depicted) pops up on the screen to enable inputting of a sticking weight $W_f$ and a falling weight $W_d$ on the screen. The inputted sticking weight $W_f$ and falling weight $W_d$ are outputted to the load calculation section 26 and the illustration creation section 28 in the controller 18.

Now, a flow of calculation of the load measurement system in the present embodiment is described with reference to a flow chart depicted in FIG. 17. First, processes at steps S1 to S5 and steps S32 and S33 same as those in FIG. 5 are performed.

At step S171, the illustration creation section 28 calculates a total value $W_s$ of an appropriate loading weight $W_a$, a sticking weight $W_f$ and a falling weight $W_d$. Then, the illustration creation section 28 calculates a ratio $W_g$ between the bucket capacity $W_{cap}$ and the total value $W_s$ at step S172 and recalls an appropriate amount illustration 30 corresponding to the ratio $W_g$ as a corrected appropriate amount illustration 30A from the storage device 40 at step S173.

At step S174, the illustration creation section 28 creates a target illustration 31A in which the bucket illustration 29 created at step S4 and the corrected appropriate amount illustration 30A created at step S173 are superimposed and outputs the target illustration 31A to the display device 19, and at step S10, the target illustration 31A is displayed on the screen of the display device 19.

At step S11, the load calculation section 26 calculates an actual loading weight $W_k$ on the basis of the signals inputted from the posture sensor 101 and the pressure sensor 102, and at step S175, a value obtained by subtracting the total value of the sticking weight $W_f$ and the falling weight $W_d$ from the actual loading weight $W_k$ (the corrected actual loading weight $W'_k = W_k - (W_f + W_d)$) is displayed in the excavation amount 33 of the display device 19. Succeeding processes are same as those of the flow chart of FIG. 5.

It is to be noted that, in the case where an integrated loading weight is utilized when an appropriate loading weight $W_a$ for a next cycle is calculated as in the case of the flow chart depicted in FIG. 3, it is preferable to calculate not an integrated value of the actual loading weight $W_k$ but an integrated value ($\Sigma W'k$) of the corrected actual loading weight $W'_k$.

Also in the embodiment configured in such a manner as described above, it is possible to allow the operator to intuitively grasp by what capacity the working objects are to be placed into the bucket 7 by a next time excavation work. Especially, in the present embodiment, since an illustration (a corrected appropriate amount illustration 30A) of working objects whose capacity is corrected to a rather great amount taking the weight of the working objects that are not discharged to the cargo bed of a dump truck (the sticking weight $W_f$ and the falling weight $W_d$) into consideration, is displayed on the display device 19, such a situation that the loading weight of the dump truck becomes lower than an estimated value because of sticking matters or falling matters can be prevented, and degradation of the working efficiency can be prevented.

<Others>

Figure 13:
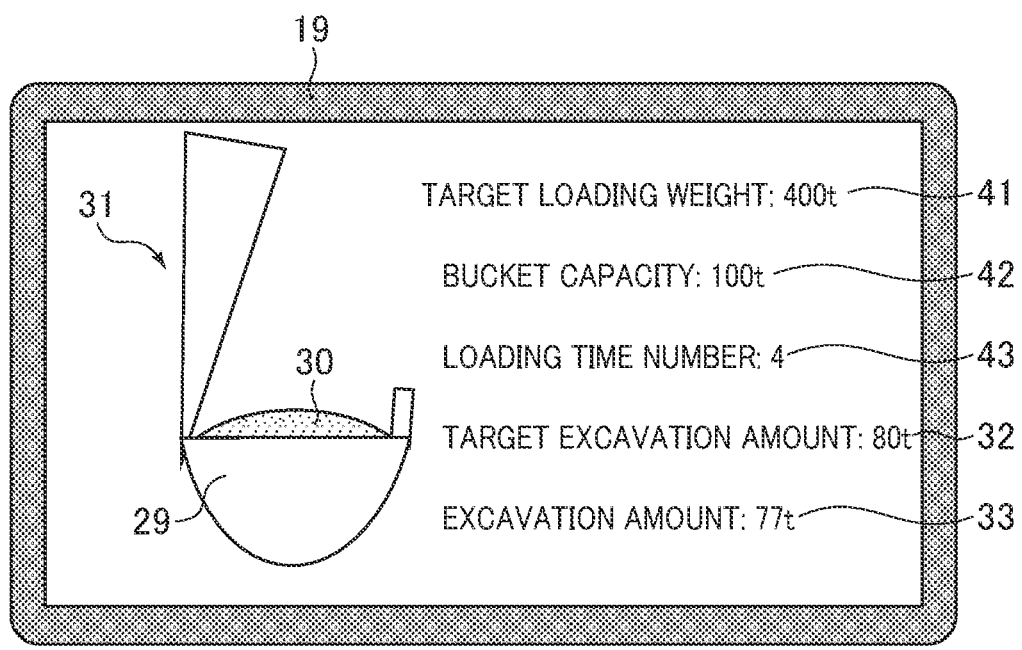
FIG. 13 is an example of an appearance view of a display screen of a still further display device according to the present invention.

Although, in the embodiments described above, a view (a perspective view) of the bucket 7 held in the specific posture as viewed from the cab 17 is adopted as the bucket illustration 29, a view of the bucket 7 held in the specific posture as viewed from a side (a side elevational view) as depicted in FIG. 13 of the bucket 7, may be adopted as the bucket illustration, or a view as viewed from any other point of view may be adopted as the bucket illustration.

Figure 14:
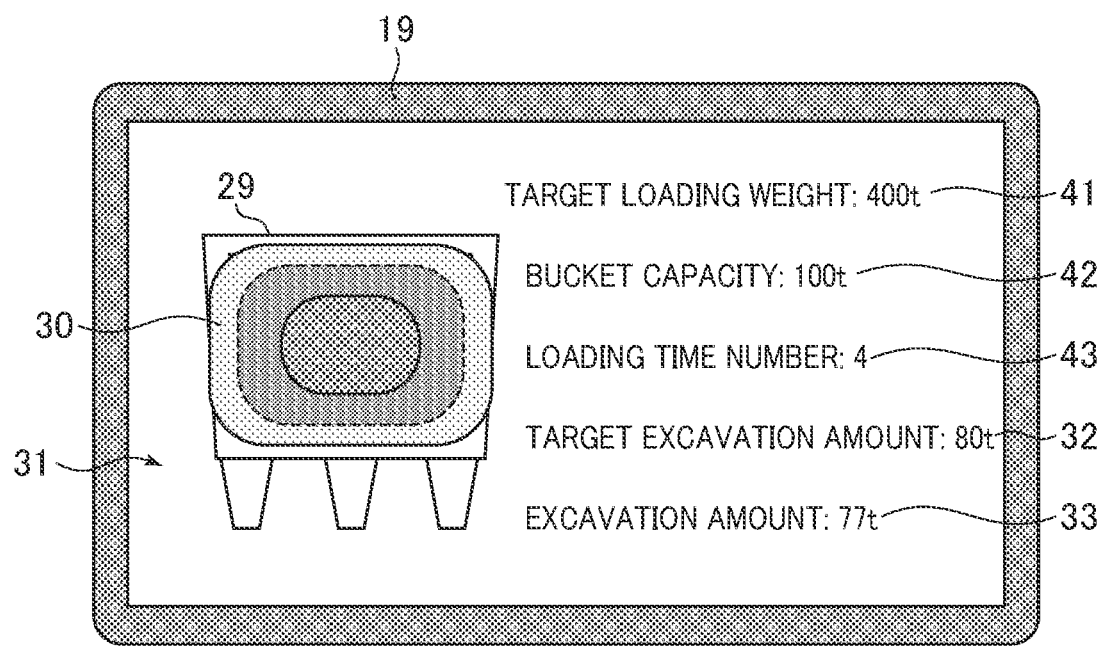
FIG. 14 is an example of an appearance view of a display screen of a yet further display device according to the present invention.

Further, although, in the embodiments described above, an appropriate amount illustration 30 is created assuming that the surface of working objects in the bucket 7 is a flat face, an appropriate amount illustration 30 may be created otherwise assuming that working objects are piled up with predetermined gradients from forward, rearward, leftward and rightward directions of the bucket 7 as depicted in FIG. 14. In the example of the appropriate amount illustration 30 of FIG. 14, the shape of the piled working objects is represented by contour lines, and regions surrounded by the contour lines are presented by different colors.

Further, the target illustration 31 or the result illustration 39 may be created in the following manner. In particular, a three-dimensional model of the bucket 7 is created on the basis of bucket shape information, and a state in which working objects of the appropriate loading weight $W_a$ are placed in the bucket 7 of the three-dimensional model is simulated. Then, the target illustration 31 or the result illustration 39 is created on the basis of a view when the state mentioned is viewed from a predetermined direction. Further, the "predetermined direction" in this case is preferably configured so as to be suitably changed to a desired direction by the operator, and also the specific posture of the bucket 7 at the time is preferably configured for suitable change to a posture desired by the operator.

The present invention can be applied not only to a hydraulic excavator utilized for explanation in the foregoing description of the embodiments but also to construction machines that perform excavation and loading by a front work implement such as a wheel loader. Further, while, in the embodiments described above, it is described that the hauling vehicle is a dump track, for example, also a large-sized truck or some other self-propelled construction machine that can carry luggage can be utilized.

Further, the present invention is not limited to the embodiments described above and includes various modifications without departing from the subject matter thereof. For example, the present invention is not limited to configurations that include all components described in connection with the embodiments described above and includes also configurations in which part of the components is deleted. Further, it is possible to add or substitute part of the components of a certain embodiment to or with the components of a different embodiment.

Further, the components of the controller described above or the functions, execution processes and so forth of the components may be implemented partly or entirely by hardware (for example, logics that execute the functions are designed as an integrated circuit or circuits). Further, the components of the controller described above may be given as a program (software) that implements the functions of the components of the controller by being read out and executed by an arithmetic processing unit (for example, a CPU). Information relating to the program can be stored, for example, in a semiconductor memory (a flash memory, an SSD or the like), a magnetic storage device (a hard disk drive or the like), a recording medium (a magnetic disk, an optical disk or the like) or the like.

DESCRIPTION OF REFERENCE CHARACTERS

1: Hydraulic excavator
2: Front work implement
5: Boom
6: Arm
7: Bucket
8: Boom cylinder
9: Arm cylinder (hydraulic cylinder)
10: Bucket cylinder (hydraulic cylinder)
12: Boom angle sensor
13: Arm angle sensor
14: Bucket angle sensor
15: Boom bottom cylinder pressure sensor
16: Boom rod cylinder pressure sensor
17: Cab
18: Controller (control apparatus)
19: Display device
20: Target loading weight setting section
21: Bucket shape setting section
22: Load measurement start switch
23: Load measurement end switch
25: Sensor signal inputting section
26: Load calculation section
27: Loading weight calculation section
28: Illustration creation section
29: Bucket illustration
30: Appropriate amount illustration
30A: Corrected appropriate amount illustration
31: Target illustration
31A: Target illustration
34: Upper and lower limit weight calculation section
35: Appropriate amount upper limit illustration
36: Appropriate amount lower limit illustration
38: Actual loading amount illustration
39: Result illustration
40: Storage device
44: Upper limit allowable amount inputting portion
45: Lower limit allowable amount inputting portion
50: Inputting device
61: Loading time number setting section
62: Sticking weight inputting section
63: Falling weight inputting section
66: Sticking and falling weight setting section

The invention claimed is:

1. A construction machine comprising: a work implement including a bucket; a controller configured to calculate a weight of working objects in the bucket; and a display device configured to display the weight of the working objects calculated by the controller, wherein
the controller:
calculates, based on a target loading weight that is a target value of a total weight of working objects to be loaded into a hauling vehicle, a set loading time number indicative of a loading time number required for the construction machine before the target loading weight is reached and bucket shape information indicative of a shape of the bucket, an appropriate loading weight that is an appropriate value of the weight of the working objects to be loaded into the hauling vehicle by a single time loading work by the construction machine in order to load the working objects of the target loading weight into the hauling vehicle by a number of loading works equal to the set loading time number,
creates an appropriate amount illustration that is an illustration of a state at which the working objects of the appropriate loading weight are loaded into the bucket having a predetermined posture and that illustrates the state of the working objects in the bucket, based on the appropriate loading weight and the bucket shape information, and controls the display device to display an illustration of the bucket having the predetermined posture and the appropriate amount illustration in a superimposed relationship.

2. The construction machine according to claim 1, wherein
the controller:
calculates, based on the posture of the work implement and a pressure of hydraulic fluid that acts upon a hydraulic cylinder for driving the work implement, an actual loading weight that is a weight of the working objects in the bucket during action of the work implement,
calculates the appropriate loading weight based on a value obtained by subtracting an integrated value of the actual loading weight that is a weight of the working objects loaded already on the hauling vehicle from the target loading weight, a value obtained by subtracting a number of times of a loading work carried out already from the set loading time number and the bucket shape information,
creates the appropriate amount illustration based on the appropriate loading weight and the bucket shape information, and
controls the display device to display, every time a one-time loading work into the hauling vehicle by the construction machine is completed, an illustration of the bucket having the predetermined posture and the appropriate amount illustration.

3. The construction machine according to claim 1, wherein
the controller further includes a storage device in which a plurality of the appropriate amount illustrations corresponding to the appropriate loading weight are stored for each shape of the bucket in advance, and
the controller:
selects an appropriate amount illustration confirming to the appropriate loading weight and the bucket shape information from among the plurality of appropriate amount illustrations stored in the storage device, and
controls the display device to display the illustration of the bucket having the predetermined posture and the selected appropriate amount illustration in a superimposed relationship.

4. The construction machine according to claim 1, wherein
the controller:
calculates an appropriate upper limit weight that is an allowable upper limit value of a weight of the working objects to be loaded into the hauling vehicle by a one-time loading work on a basis of the appropriate loading weight and a predetermined upper limit coefficient, and calculates an appropriate lower limit weight that is an allowable lower limit value of a weight of the working objects to be loaded into the hauling vehicle by a one-time loading work on a basis of the appropriate loading weight and a predetermined lower limit coefficient,
creates, based on the appropriate upper limit weight and the bucket shape information, an appropriate amount upper limit illustration that is an illustration of a state at which the working objects of the appropriate upper limit weight are loaded into the bucket having the predetermined posture and that illustrates the state of the working objects in the bucket, and creates, based on the appropriate lower limit weight and the bucket shape information, an appropriate amount lower limit illustration that is an illustration of a state at which the working objects of the appropriate lower limit weight are loaded into the bucket having the predetermined posture and that illustrates the state of the working objects in the bucket, and
controls the display device to display an illustration of the bucket having the predetermined posture, the appropriate amount illustration, the appropriate amount upper limit illustration and the appropriate amount lower limit illustration in a superimposed relationship.

5. The construction machine according to claim 4, further comprising:
an inputting device configured to input the upper limit coefficient and the lower limit coefficient.

6. The construction machine according to claim 1, wherein
the controller:
calculates, based on a posture of the work implement and a pressure of hydraulic fluid that acts upon a hydraulic cylinder for driving the work implement, an actual loading weight that is a weight of the working objects in the bucket during action of the work implement,
creates, based on the actual loading weight and the bucket shape information, an actual loading amount illustration that is an illustration of a state at which the working objects of the actual loading weight are loaded into the bucket having the predetermined posture and that illustrates the state of the working objects in the bucket, and
controls the display device to display the illustration of the bucket having the predetermined posture, the appropriate amount illustration and the actual loading amount illustration in a superimposed relationship.

7. The construction machine according to claim 1, further comprising:
an inputting apparatus for inputting a sticking weight that is a weight of the working objects sticking to the bucket, wherein
the controller:
creates, based on a total value of the appropriate loading weight and the sticking weight and the bucket shape information, a corrected appropriate amount illustration that is an illustration of a state at which the working objects of the total value are loaded into the bucket having the predetermined posture and that illustrates the state of the working objects in the bucket, and
controls the display device to display the illustration of the bucket having the predetermined posture and the corrected appropriate amount illustration in a superimposed relationship.

8. The construction machine according to claim 1, further comprising:
an inputting device for inputting a falling weight indicative of a weight of the working objects having fallen from the bucket upon loading into the hauling vehicle, wherein
the controller:
creates, based on a total value of the appropriate loading weight and the falling weight and the bucket shape information, a corrected appropriate amount illustration that is an illustration of a state at which the working objects of the total value are loaded into the bucket having the predetermined posture and that illustrates the state of the working objects in the bucket, and controls the display device to display the illustration of the bucket having the predetermined posture and the corrected appropriate amount illustration in a superimposed relationship.

9. The construction machine according to claim 1, wherein the predetermined posture in the illustration of the bucket and the appropriate amount illustration to be displayed on the display apparatus is changeable.

\* \* \* \* \*